(12) United States Patent
Yaegashi

(10) Patent No.: US 12,247,633 B2
(45) Date of Patent: Mar. 11, 2025

(54) VIBRATION ISOLATOR AND OUTDOOR UNIT FOR AIR-CONDITIONING APPARATUS

(71) Applicant: Mitsubishi Electric Corporation, Tokyo (JP)

(72) Inventor: Naoki Yaegashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 361 days.

(21) Appl. No.: 17/789,531

(22) PCT Filed: Feb. 17, 2020

(86) PCT No.: PCT/JP2020/006062
§ 371 (c)(1),
(2) Date: Jun. 28, 2022

(87) PCT Pub. No.: WO2021/166030
PCT Pub. Date: Aug. 26, 2021

(65) Prior Publication Data
US 2023/0052219 A1    Feb. 16, 2023

(51) Int. Cl.
*F16F 15/00*   (2006.01)
*F04B 39/00*   (2006.01)
*F16F 15/08*   (2006.01)

(52) U.S. Cl.
CPC .......... *F16F 15/08* (2013.01); *F04B 39/0044* (2013.01)

(58) Field of Classification Search
None
See application file for complete search history.

(56) References Cited

U.S. PATENT DOCUMENTS 6,260,373 B1 * 7/2001 Rockwood .............. F16F 7/104
165/69
10,527,063 B2 * 1/2020 Alban ................ F04D 25/0606
(Continued)

FOREIGN PATENT DOCUMENTS

CN    204986239 U    1/2016
JP     6-249467 A    9/1994
(Continued)

OTHER PUBLICATIONS

International Search Report and Written Opinion mailed on May 19, 2020, received for PCT Application PCT/JP2020/006062, filed on Feb. 17, 2020, 10 pages including English Translation.

*Primary Examiner* — Steven M Marsh
(74) *Attorney, Agent, or Firm* — XSENSUS LLP

(57) ABSTRACT

Provided is a vibration isolator in which simplification of detachment work of a fixing component attached to a vibration isolating component enables the natural frequency of the entire support structure for a vibration source to be easily changed.
A vibration isolator includes a vibration isolating component including a rubber, which is an elastic body, the vibration isolating component supporting, in a housing having a slit, a support portion of a compressor as a vibration source that includes a motor and that is provided on a bottom plate of the housing; and a fixing component provided to pass through the slit and detachable from an outside of the housing, the vibration isolating component being fixed, in the housing, with the fixing component such that the fixing component is in contact with part of a periphery of a narrow portion of the vibration isolating component.

9 Claims, 19 Drawing Sheets

(56) References Cited

U.S. PATENT DOCUMENTS

| | | | | |
|---|---|---|---|---|
| 12,104,585 | B2* | 10/2024 | Elsaadani | F04B 39/0044 |
| 2001/0017435 | A1* | 8/2001 | Yoshida | F16H 19/0672 |
| | | | | 267/141 |
| 2002/0158390 | A1* | 10/2002 | Braman | F16F 15/08 |
| | | | | 267/140.13 |
| 2013/0142680 | A1* | 6/2013 | Tamawari | F04B 17/03 |
| | | | | 417/410.1 |
| 2020/0080617 | A1* | 3/2020 | Thawani | F16F 15/08 |
| 2023/0027815 | A1* | 1/2023 | Elsaadani | F04B 35/04 |

FOREIGN PATENT DOCUMENTS

| | | |
|---|---|---|
| JP | 7-103513 A | 4/1995 |
| JP | 10-38027 A | 2/1998 |
| JP | 2018-131933 A | 8/2018 |

* cited by examiner (A)

(B)

(C)

VIBRATION ISOLATOR AND OUTDOOR UNIT FOR AIR-CONDITIONING APPARATUS

CROSS-REFERENCE TO RELATED APPLICATION

The present application is based on PCT filing PCT/JP2020/006062, filed Feb. 17, 2020, the entire contents of which are incorporated herein by reference.

TECHNICAL FIELD

The present disclosure relates to a vibration isolator and an outdoor unit for an air-conditioning apparatus, the outdoor unit including the vibration isolator.

BACKGROUND ART

There has been a technique related to a vibration isolator (see, for example, Patent Literature 1). In the technique, attachment of a fixing component to a vibration isolating component configured to support a vibration source such as a compressor to isolate vibrations of the vibration source increases the natural frequency of the entire support structure for the vibration source to reduce, for example, pipe breakage due to vibrations during transportation. In addition, detachment of the fixing component after transportation reduces the natural frequency, and the vibration isolating component thus absorbs vibrations generated by operation of the vibration source.

CITATION LIST

Patent Literature

Patent Literature 1: Japanese Unexamined Patent Application Publication No. 6-249467

SUMMARY OF INVENTION

Technical Problem

However, in the vibration isolator, the entire fixing component is provided in a housing, and a housing panel thus has to be detached and mounted again to detach the fixing component. The vibration isolator thus has a problem in that detachment work of the fixing component is complex.

The present disclosure is made to solve the above problem, and an object of the present disclosure is to obtain a vibration isolator whose detachment work of fixing component is simplified.

Solution to Problem

A vibration isolator according to an embodiment of the present disclosure includes a vibration isolating component including an elastic body, the vibration isolating component supporting, in a housing having a slit, a vibration source that includes a motor and that is provided on a bottom plate of the housing; and a fixing component provided to pass through the slit and detachable from an outside of the housing, the vibration isolating component being fixed, in the housing, with the fixing component.

Advantageous Effects of Invention

The vibration isolator according to an embodiment of the present disclosure simplifies detachment work of the fixing component provided such that the vibration isolating component is fixed with the fixing component and thus has an effect that the natural frequency of the entire support structure for a vibration source is easily changed.

DESCRIPTION OF EMBODIMENTS

Embodiments of the present disclosure will be described below with reference to the drawings. In the following drawings, the same or corresponding parts have the same reference signs, and their descriptions are not repeated.

Embodiment 1

A vibration isolator and an outdoor unit for an air-conditioning apparatus in Embodiment 1 will be described with reference to FIGS. 1 to 6. Examples in which a vibration isolator is included in an outdoor unit for an air-conditioning apparatus will be described below, but the configuration is not limited to the described examples. A vibration isolator may be included in units other than an outdoor unit for an air-conditioning apparatus, such as an outdoor unit for a hot-water supply apparatus, as long as the units have a configuration in which a vibration source including a motor is provided in a housing.

Figure 1:
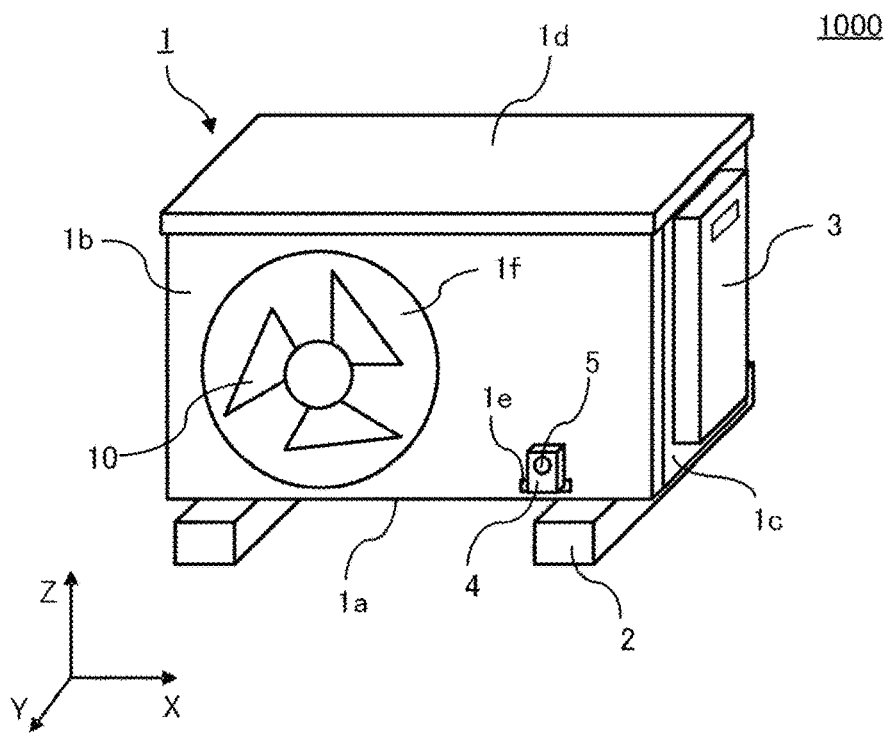
FIG. 1 is a perspective view illustrating the exterior of an outdoor unit for an air-conditioning apparatus in Embodiment 1.

Hereinafter, the XYZ rectangular coordinates are defined as illustrated in FIG. 1 such that the Z direction is a vertical direction and such that the XY plane is a horizontal plane. In the following description, when directions are assigned a plus or minus sign, the +X direction, the +Y direction, and the +Z direction refer to the respective directions of arrows of the rectangular coordinates illustrated in each figure. Hereinafter, for convenience, the +Z direction is sometimes described as "upward", and the −Z direction is sometimes described as "downward". However, the downward direction, that is, the −Z direction, is not limited to the direction of gravity, and, for example, a configuration in which the direction of gravity is the +Z direction may be used.

Figure 2:
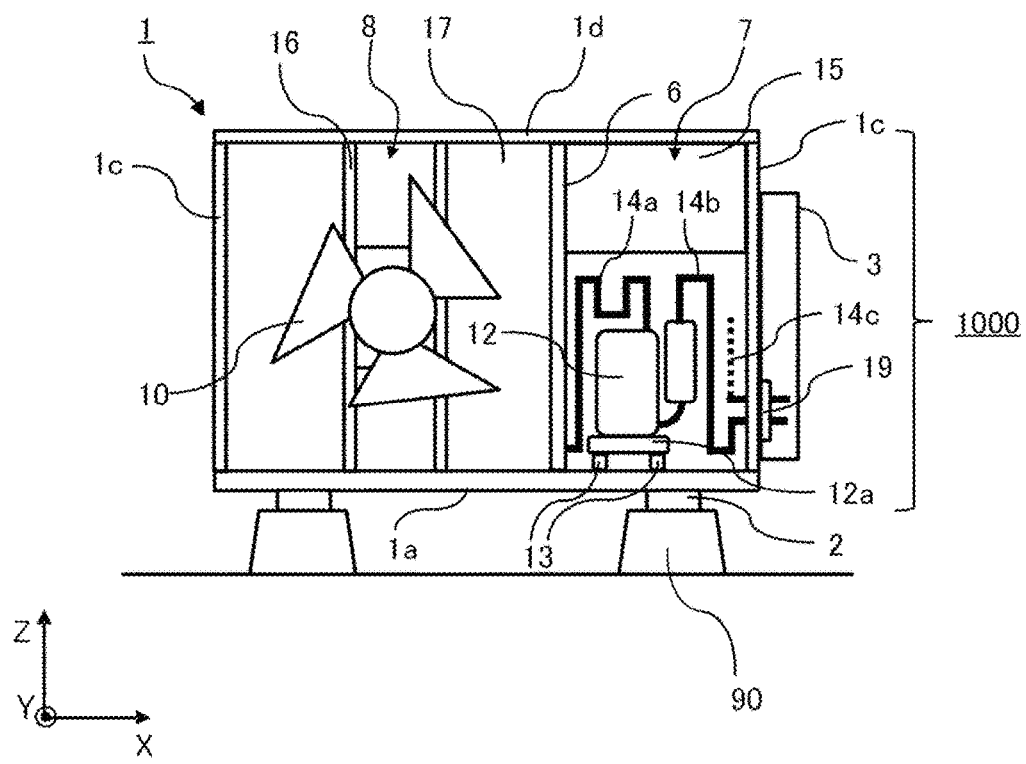
FIG. 2 is a front view illustrating the inside of the outdoor unit for an air-conditioning apparatus in Embodiment 1, the outdoor unit having been installed.
Figure 3:
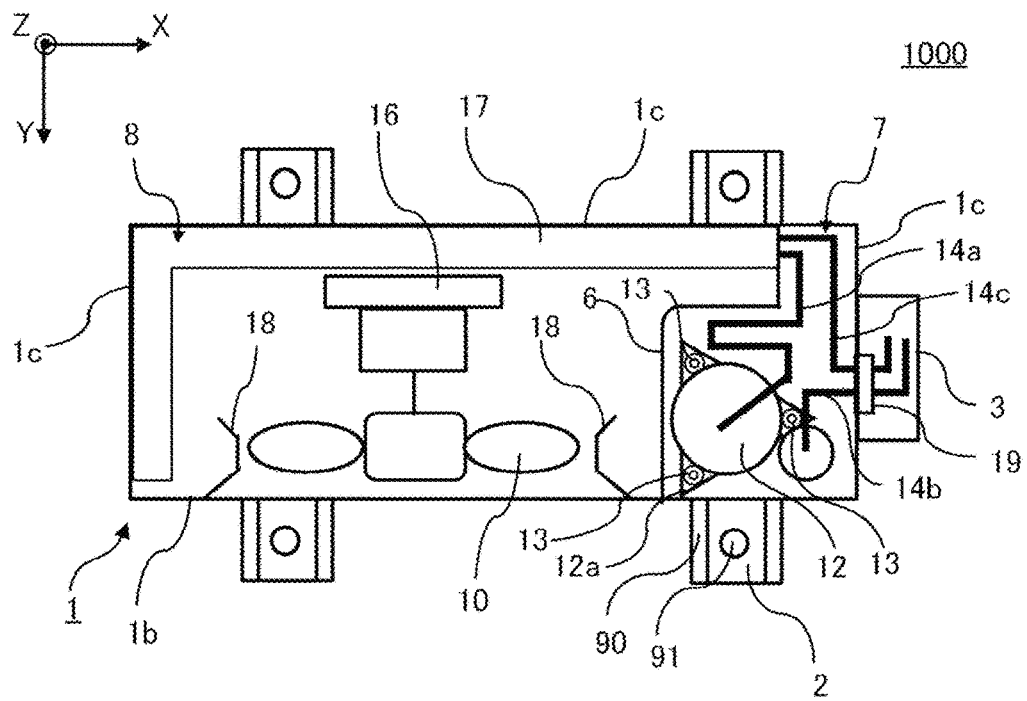
FIG. 3 is a top view illustrating the inside of the outdoor unit for an air-conditioning apparatus in Embodiment 1, the outdoor unit having been installed.

First, the entire configuration of an outdoor unit 1000 for an air-conditioning apparatus will be described with reference to FIGS. 1 to 3. FIG. 1 is a perspective view illustrating the exterior of the outdoor unit 1000 for an air-conditioning apparatus in Embodiment 1. FIG. 2 is a front view illustrating the inside of the outdoor unit 1000 when viewed in the +Y direction. FIG. 3 is a top view illustrating the inside of the outdoor unit 1000 when viewed in the +Z direction. FIG. 1 illustrates the outdoor unit 1000 that is yet to be installed, for example, during shipment or transportation. FIGS. 2 and 3 illustrate the outdoor unit 1000 installed at a setting surface, a fixing component 4 having been detached from the outdoor unit 1000. Figures described below illustrate, unless otherwise noted, a state in which the outdoor unit 1000 is yet to be installed, for example, during shipment or transportation.

As illustrated in FIG. 1, the outdoor unit 1000 includes, as its exterior, a housing 1, which has a cuboid shape and which is formed by a bottom plate 1a, a front panel 1b, a side panel 1c including a rear of the housing 1, and a top plate 1d. Two legs 2 are provided below the bottom plate 1a of the housing 1. A side cover 3 is provided on the surface of the side panel 1c at the +X side. In addition, part of the fixing component 4 is inserted into a slit 1e, which is provided in the front panel 1b of the housing 1. The fixing component 4 is fixed, from the outside of the housing 1, to the front panel 1b with a screw 5 serving as a fastening component. Furthermore, a fan section 1f, in which a fan 10 provided in the housing 1 is capable of sending air inside the outdoor unit 1000 to the outside, is provided in the front panel 1b of the housing 1.

As illustrated in FIGS. 2 and 3, the inside of the housing 1 of the outdoor unit 1000 is partitioned into a machine chamber 7 and a fan chamber 8 by a separator 6. As illustrated in FIG. 3, the separator 6 is a plate-like partition provided and bent in the housing 1. The machine chamber 7 is located at the +X side from the separator 6. The fan chamber 8 is located at the −X side from the separator 6.

A compressor 12 as a vibration source including a motor, a plurality of vibration isolating components 13, which are provided to support a support portion 12a of the compressor 12 on the bottom plate 1a of the housing 1, refrigerant pipes 14a, 14b, and 14c, which are connected to the compressor 12 or other parts, and a control board 15 for exercising operation control are provided in the machine chamber 7. In addition, the fan 10, a fan support 16, which supports the fan 10, an outdoor heat exchanger 17, and a bell mouth 18, which is attached to the inside of the front panel 1b, are provided in the fan chamber 8. Bases 90, each of which has a block-like shape and which are used for installing the outdoor unit 1000 at a setting surface with the legs 2 located between the outdoor unit 1000 and the bases 90, and bolts 91 for fixing the legs 2 to the respective bases 90 are not included in the components of the outdoor unit 1000.

The housing 1 is formed by the bottom plate 1a, the front panel 1b, the side panel 1c, and the top plate 1d. As illustrated in FIG. 3, the side panel 1c forms three, other than the surface of the front panel 1b provided at the +Y side, of the four sides of the housing 1 having a cuboid shape. In addition, as illustrated in FIG. 1, the front panel 1b has the slit 1e, whose long-side direction is the X direction and into which the fixing component 4 is inserted, and a fastening hole 1g (not illustrated in FIGS. 1 to 3), through which the screw 5 passes. Furthermore, as illustrated in FIG. 3, the bell mouth 18 is attached to the inside of the front panel 1b to surround the fan 10. To detach the front panel 1b, the front panel 1b has to be moved in the +Y direction. The top plate 1d is provided to cover the upper side of the housing 1. It is possible to detach the front panel 1b after the top plate 1d is detached.

The compressor 12 is a vibration source that includes a motor and that generates vibrations during operation. As illustrated in FIGS. 2 and 3, the compressor 12 includes the support portion 12a. In the machine chamber 7, the vibration isolating components 13 support the support portion 12a on the bottom plate 1a of the housing 1 to isolate vibrations. In addition, the compressor 12 is connected to the outdoor heat exchanger 17 by the refrigerant pipe 14a. The compressor 12 and the outdoor heat exchanger 17 are each connected, via the refrigerant pipes 14b and 14c to an indoor heat exchanger (not illustrated) of an indoor unit set on the outside of the outdoor unit 1000. The refrigerant pipes 14b and 14c extend from the machine chamber 7 to the outside of the housing 1 via a flare connection portion 19. After the outdoor unit 1000 is installed, the flare connection portion 19 and refrigerant pipes (not illustrated) of the indoor unit are connected to each other.

A case in which the vibration source is a compressor is described in Embodiment 1, but the configuration is not limited to the described case. The vibration source may be any other device as long as the device includes a motor and generates vibrations. In addition, a case in which the vibration isolating components 13 support the support portion 12a of the compressor 12 to isolate vibrations is described in Embodiment 1, but the configuration is not limited to the described case. For example, a configuration may be used in which a vibration isolating component supports one or a plurality of vibration sources mounted on a seat that is interposed between the one or the plurality of vibration sources and the vibration isolating component to isolate vibrations.

As illustrated in FIG. 2, the control board 15 for exercising operation control of the outdoor unit 1000 is provided in the machine chamber 7. A power source (not illustrated) on the outside of the outdoor unit 1000 is connected to the control board 15. The side cover 3 attached to the side panel 1c of the housing 1 is provided to cover the flare connection portion 19 and a power source connection portion (not illustrated) of the control board 15. The side cover 3 may double as a grip used, for example, during transportation or installation of the outdoor unit 1000. Although not illustrated, the machine chamber 7 contains an expansion valve for decompressing refrigerant. In addition, components that increase the functionality of the outdoor unit 1000, such as a four-way valve for switching between directions in which refrigerant flows, a reservoir for controlling the amount of refrigerant circulated, and a service port where pipes diverge for introducing and removing refrigerant gas into or out of pipes during repair, may be set in the machine chamber 7.

The fan 10 for promoting heat exchange in the outdoor heat exchanger 17 and the fan support 16, which supports the fan 10, are provided in the fan chamber 8. In addition, as illustrated in FIG. 3, the bell mouth 18 for adjusting airflow generated by the fan 10 is provided in the fan chamber 8. To improve the air-conditioning performance of an air-conditioning apparatus, the amount of heat exchanged has to be increased by increasing the area of the outdoor heat exchanger 17. The installation area and the height are accordingly required to be increased. To reduce the resistance of airflow, the separator 6 is set not to block an air passage for the outdoor heat exchanger 17.

Figure 4:
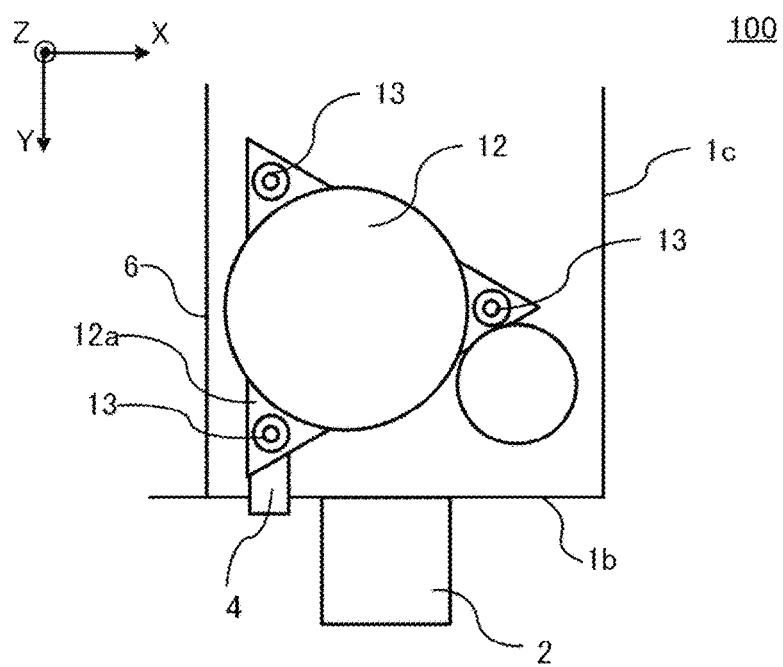
FIG. 4 is a top view illustrating part of a vibration isolator in Embodiment 1.
Figure 5:
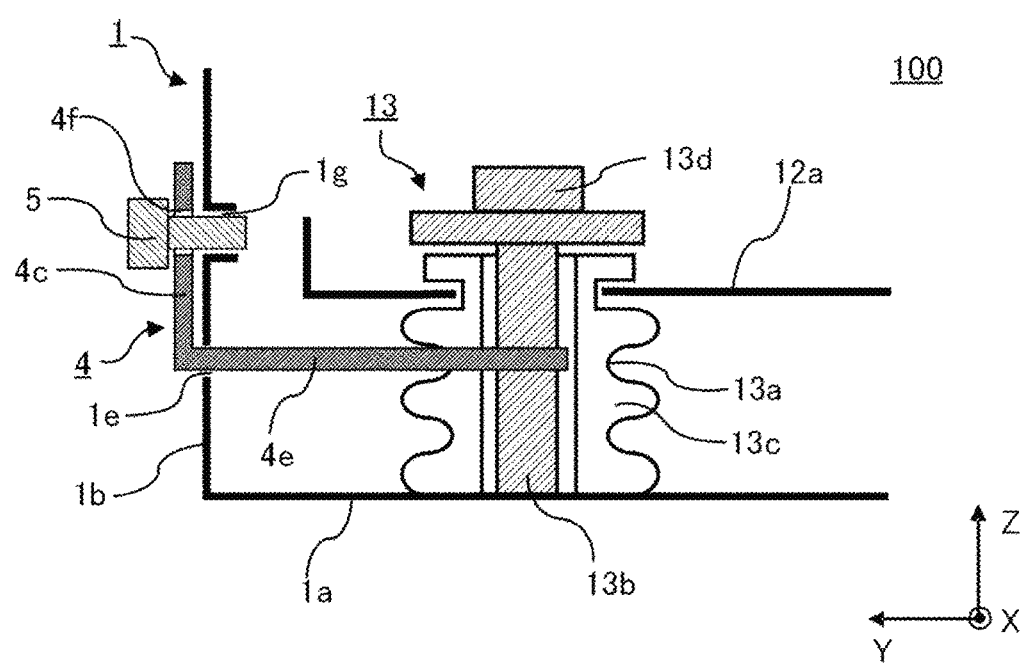
FIG. 5 is a sectional view illustrating part of the vibration isolator in Embodiment 1.
Figure 6:
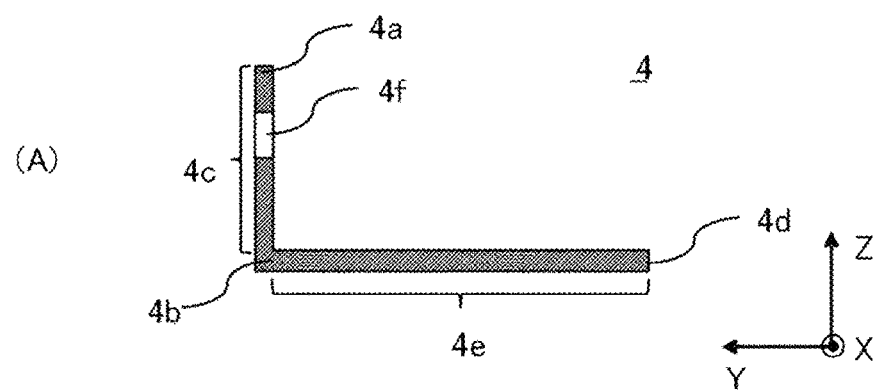
FIG. 6 includes a sectional view and top views for describing a fixing component of the vibration isolator in Embodiment 1.
Figure 6:
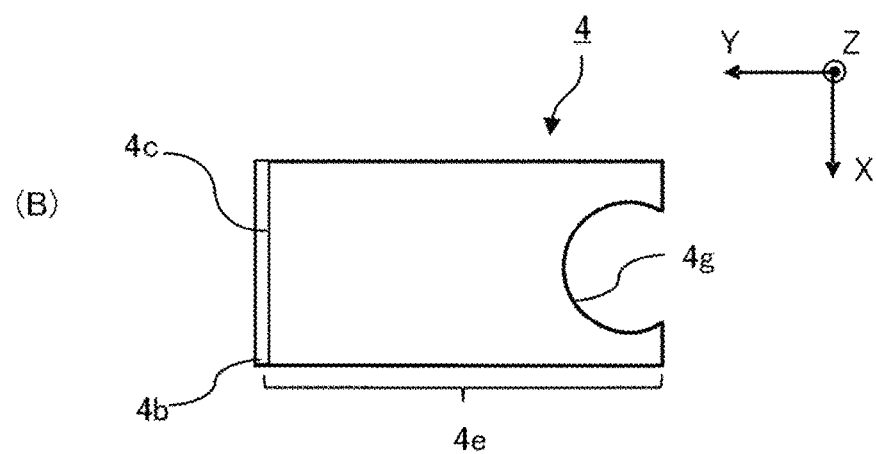
Figure 6:
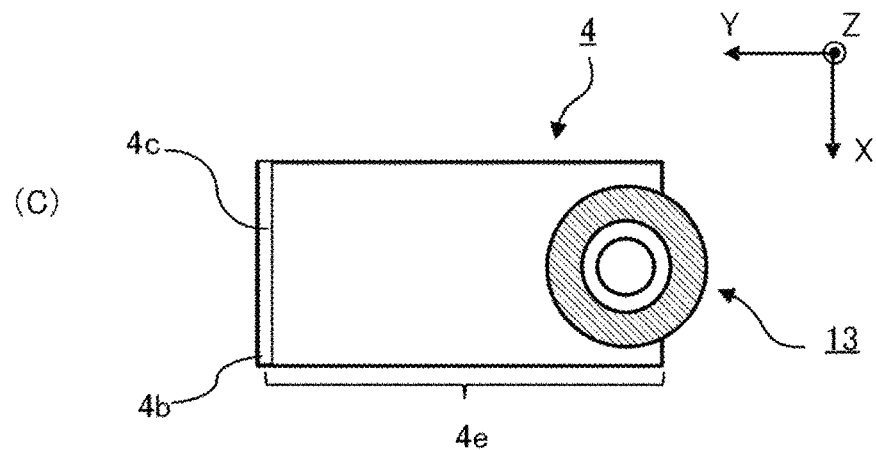

Here, the details of a vibration isolator 100, which is part of the outdoor unit 1000 for an air-conditioning apparatus, are described with reference to FIGS. 4 to 6. FIG. 4 is a top view illustrating part of the vibration isolator 100 when viewed in the +Z direction. FIG. 5 is a sectional view illustrating part of the vibration isolator 100 when viewed in the +X direction. FIG. 6(A) is a sectional view illustrating the fixing component 4 of the vibration isolator 100. FIG. 6(B) is a top view illustrating the fixing component 4. FIG. 6(C) is a top view illustrating the fixing component 4 attached to the vibration isolating component 13.

As illustrated in FIGS. 4 and 5, the vibration isolator 100 is formed by the vibration isolating components 13, which are provided in the housing 1 including the front panel 1b having the slit 1e to support the support portion 12a of the compressor 12, as a vibration source including a motor, on the bottom plate 1a, the fixing component 4, which is provided to pass through the slit 1e and detachable from the outside of the housing 1 and which is attached, in the housing 1, to a narrow portion 13a of the vibration isolating component 13, and the screw 5, which serves as a fastening component with which the fixing component 4 is fixed to the front panel 1b of the housing 1.

As illustrated in FIG. 4, a plurality of (here, three) vibration isolating components 13 are provided to one compressor 12. As illustrated in FIG. 5, the vibration isolating component 13 is formed by a stud 13b, which is fixed onto the bottom plate 1a of the housing 1, a rubber 13c, which is an elastic body that is attached to the stud 13b and that includes the narrow portions 13a, and a stopper 13d, which is attached to an upper part, that is, a screw portion on the +Z side, of the stud 13b. That is, the vibration isolating component 13 includes an elastic body as its component. The vibration isolating component 13 supports, with the rubber 13c, the support portion 12a of the compressor 12.

More specifically, the vibration isolating component 13 is positioned by fixing, by welding, the stud 13b having a rod shape onto the bottom plate 1a and by attaching the rubber 13c to the periphery of the stud 13b. The stopper 13d is attached to the screw portion at an end of the stud 13b to form a shoulder bolt. Thus, it is possible to inhibit the compressor 12 from being displaced in the Z-axis direction because of impact during transportation and to reduce pipe breakage.

The rubber 13c of the vibration isolating component 13 is made of a synthetic rubber material. Rubber materials are incompressible. Thus, when a load is applied to a rubber material in the vertical direction, that is, the Z direction, the rubber material attempts to deform in horizontal directions, that is, directions along the XY plane. When there is no space in which the rubber material deforms in the directions along the XY plane, this configuration inhibits the deformation of the rubber material and thus inhibits displacement of the rubber material in the Z direction. In this case, when the vibration isolating component 13 is regarded as a spring, the amount of displacement to a load is small. Thus, the spring constant is increased. The spring constant of the vibration isolating component 13 thus has a relationship with the shape in addition to the rigidity of the material. In Embodiment 1, the narrow portions 13a are provided at the side of the vibration isolating component 13, and the vibration isolating component 13 is thus formed to have a large surface area in the direction along the side and cause a reduction in the spring constant.

A configuration in which the side of the vibration isolating component 13 has a plurality of narrow portions 13a is illustrated, but the configuration is not limited to the illustrated configuration. The side of the vibration isolating component 13 only has to have at least one narrow portion. In addition, a configuration in which the vibration isolating component 13 includes the rubber 13c as an elastic body is described in Embodiment 1, but the configuration is not limited to the described configuration. The vibration isolating component 13 may include a component made of, for example, a thermoplastic elastomer as an elastic body.

As illustrated in FIG. 6(A), the fixing component 4 includes a first flat part 4c, which extends from one end 4a to a bent portion 4b, and a second flat part 4e, which extends from the bent portion 4b to the other end 4d. The fixing component 4 has the shape of a plate bent to have an L shape. In addition, the first flat part 4c of the fixing component 4 has a first hole 4f, through which the screw 5 passes. As illustrated in FIG. 6(B), the second flat part 4e of the fixing component 4 has a cutout 4g, which has an arc shape in plan view. A case in which the fixing component 4 includes one bent portion 4b to have an L shape is described in Embodiment 1, but the configuration is not limited to the described case. For example, the fixing component 4 may have a structure including another bent portion between the bent portion 4b and the one end 4a. In addition, the first flat part 4c and the second flat part 4e do not have to be each flat, and, for example, a structure in which the first flat part 4c and the second flat part 4e are each curved may be used.

As illustrated in FIG. 5, the fixing component 4 is disposed such that the second flat part 4e is inserted into the slit 1e of the front panel 1b and such that the cutout 4g surrounds and is in contact with part of the periphery of the narrow portion 13a of the vibration isolating component 13. That is, the cutout 4g of the fixing component 4 has an arc shape along the narrow portion 13a of the rubber 13c of the vibration isolating component 13. Thus, it is possible to position the fixing component 4 and to fix the vibration isolating component 13. Then, the fixing component 4 is fixed to the housing 1 with the screw 5 such that the first flat part 4c is located along the outer surface of the front panel 1b of the housing 1. A top view of the fixing component 4 provided in this manner is FIG. 6(C).

For example, when the fixing component 4 is an L-shaped metal part formed by press working, it is possible to produce a large number of fixing components 4 at low cost. In addition, although not particularly limited, formation of each panel of the housing 1 by press working facilitates simultaneous provision of the slit 1e and the fastening hole 1g in the front panel 1b.

The screw 5 is a tapping screw. The screw 5 passes through the first hole 4f of the fixing component 4 and the fastening hole 1g provided in the front panel 1b of the housing 1 and is attached. Thus, the fixing component 4 is fastened and held along the front panel 1b of the housing 1. The screw 5 is not limited to a screw as long as the component is a fastening component with which the fixing component 4 is fastened to and held at the housing 1, and, for example, a bolt may be used. However, in any case, such a fastening component is provided and detachable from the outside of the housing.

Effects of the vibration isolator 100 and the outdoor unit 1000 for an air-conditioning apparatus in Embodiment 1 provided in this manner will be described. A compressor mounted in an outdoor unit for an air-conditioning apparatus is a main vibration source in the outdoor unit. The compressor includes a motor to compress refrigerant. Vibrations are generated during operation of the compressor because of a plurality of factors such as an axial rotational mechanical movement, an electromagnetic force generated by the motor, and a refrigerant flow. When such vibrations are transmitted to a housing, a loud noise may be generated from a metal plate of the housing that is thin and that has a large area. Thus, it is necessary to support the compressor to isolate vibrations and to inhibit vibrations from being transmitted to a floor.

In addition, vibrations are transmitted to the housing via refrigerant pipes that are connected to the compressor and through which refrigerant is transported. In addition to generating noise, pipe vibrations generated by the compressor may cause a problem such as pipe breakage due to generation of stress resulting from pipe strain. A measure of reducing the rigidity of the pipes by providing the pipes with folded portions to lengthen the pipes may be employed to reduce vibrations transmitted to the pipes and stress applied to the pipes.

A vibration isolating component for supporting the compressor to isolate vibrations is provided to absorb such vibrations generated by operation of the compressor. The vibration isolating component includes an elastic body as its component. In the case of vibration transmission in a single degree-of-freedom spring-mass system, an effect is produced that vibrations is theoretically isolated at a frequency higher than or equal to $\sqrt{2}$ times a natural frequency and the effect is determined on the basis of the frequency ratio between a natural frequency and the frequency of a vibrating force. Thus, to produce an effect that vibrations generated by operation of the compressor are isolated, a natural frequency has to be reduced, and a vibration isolating component having a small spring constant is required to be used. Provision of a narrow portion at the side of a vibration isolating component enables an increase in the surface area of the vibration isolating component in the direction along the side and thus enables a reduction in the spring constant.

On the other hand, the frequency band of vibrations generated by operation of the compressor and the frequency band of vibrations received by the outdoor unit during transportation differ from each other. For example, in a case in which the outdoor unit is transported by a truck, the amplitude, at a frequency band of 200 Hz or less, of vibrations received by the outdoor unit during transportation is larger than the amplitude at the other frequency band. In addition, particularly strong vibrations are generated at a natural frequency, and, because of vibration characteristics, the amount of displacement is increased at a lower frequency at the same acceleration and the amount of strain and thus stress are increased. Thus, it is not preferable to reduce the natural frequency of the entire support structure including the compressor and the vibration isolating component.

However, to reduce resonance caused by vibrations of the compressor, as described above, the natural frequency has to be lower than the vibration frequency, that is, the rotation speed, of the compressor. In this case, there is concern about the natural frequency being included in the frequency band at which particularly strong vibrations are generated during transportation. It is possible to obtain a vibration isolator whose fixing component is attached to a vibration isolating component during transportation to increase the natural frequency and to thus prevent, for example, pipe breakage and is detached after transportation, that is, after installation of an outdoor unit, to reduce the natural frequency and to thus absorb vibrations of a compressor.

Specifically, attachment of the fixing component to the vibration isolating component inhibits deformation of the vibration isolating component in the direction along the side and thus enables an increase in the spring constant of the vibration isolating component. In addition, the rigidity of the fixing component attached to the vibration isolating component enables an increase in the natural frequency, determined by the spring constant, of the entire support structure including the compressor and the vibration isolating component. Thus, the natural frequency of the entire support structure is adjustable by attaching the fixing component to the vibration isolating component.

In particular, when an air-conditioning apparatus operates at low performance to keep a constant indoor temperature, power consumption in a constant operation at a low rotation speed is lower than that in an operation in which the temperature is controlled by repeating starting and stopping of the compressor. Thus, the compressor is required to operate at a lower rotation speed. There is thus a need for means for avoiding both resonance caused by vibrations generated by operation of the compressor and resonance caused by vibrations during transportation. Thus, the fixing component is attached to the vibration isolating component during transportation of the outdoor unit and is detached after installation of the outdoor unit. This procedure enables easy adjustment of the natural frequency after installation and during transportation before installation and thus gains a large advantage.

However, when the fixing component is provided in the housing, a process of detaching and mounting again a housing panel has to be performed to detach the fixing component after transportation. In particular, a small outdoor unit may have a structure in which the number of separate panels that forms a housing is reduced to reduce the number of components and housing panels at respective sides of a fan chamber and a machine chamber at the front side of the outdoor unit are integrated with each other. Furthermore, since the outdoor unit is used outdoors, a top plate is mounted on a front panel and a side panel to eliminate a space facing upward to prevent entrance of rainwater. A bell mouth is attached to the front panel of the housing. Thus, the front panel has to be moved in the forward direction of the outdoor unit to detach the front panel. The front panel is thus detached after the top plate is dethatched. The work process is thus complex.

To facilitate such complex work process, as described above, the fixing component 4 is provided in the vibration isolator 100 and the outdoor unit 1000 in Embodiment 1. Thus, the fixing component 4 is detached by detaching the screw 5 and extracting the fixing component 4 from the outside of the housing 1. That is, a housing panel such as the front panel 1b does not have to be detached and mounted again. It is thus possible to simplify detachment work of the fixing component 4 and thus produce an effect that the natural frequency of the entire support structure including the compressor and the vibration isolating component is easily changed.

In addition, it is possible to visually check, from the outside of the housing 1, the state in which the fixing component 4 is attached and thus produce an effect that whether the fixing component 4 is left attached is easily checked.

Furthermore, although it is necessary to provide a space sufficient for the lengths of the refrigerant pipes 14a, 14b, and 14c to reduce vibrations transmitted from the refrigerant pipes 14a, 14b, and 14c to the housing 1, consideration does not have to be given to the ease of work in the machine chamber 7 for detaching the fixing component 4. In addition, the fixing component 4 is mounted on the vibration isolating component 13 in a horizontal direction, that is, a direction along the XY plane. Thus, space does not have to be provided above the vibration isolating component 13 and an effect is therefore produced that the installation area is effectively used and the housing is downsized.

As illustrated in FIG. 4, the vibration isolator 100 in Embodiment 1, in which the fixing component 4 is attached to one of the three vibration isolating components 13, has been described. Even in such a case, attachment of the fixing component 4 to at least one of a plurality of vibration isolating components 13 enables an increase in the natural frequency of the entire support structure including the compressor 12 and the vibration isolating components 13 and thus produce an effect that the natural frequency is easily adjusted.

Figure 7:
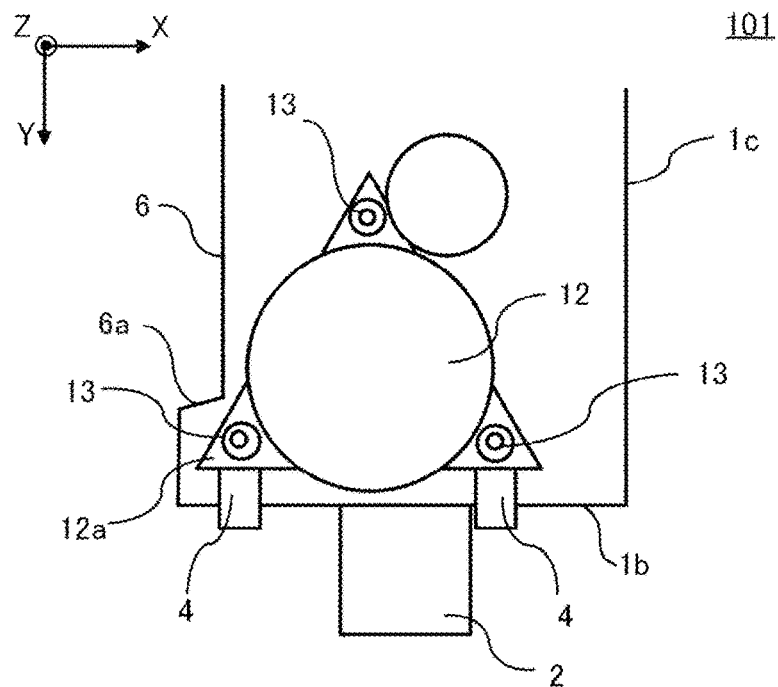
FIG. 7 is a top view illustrating part of a first modification example of the vibration isolator in Embodiment 1.

A first modification example of the vibration isolator in Embodiment 1 will be described with reference to FIG. 7. FIG. 7 is a top view illustrating part of a vibration isolator 101, which is the first modification example of the vibration isolator 100 in Embodiment 1.

As illustrated in FIG. 7, the vibration isolator 101 differs from the vibration isolator 100 in Embodiment 1 in the setting orientation of the compressor 12 and in that a lower part of the separator 6 in the +Y direction is provided to be curved toward the fan chamber 8 and in that the fixing components 4 are attached to the two respective vibration isolating components 13. The other configuration of the vibration isolator 101 is the same as the configuration of the vibration isolator 100, and its description is thus omitted.

In the vibration isolator 101, part of the support portion 12a of the compressor 12 is provided to be disposed in a curved portion 6a, which is a curved part of the separator 6. Thus, the vibration isolator 101 has a configuration in which the fixing components 4 are attached to the two respective vibration isolating components 13. Accordingly, although not illustrated in FIG. 7, two slits 1e and two fastening holes 1g are provided in the front panel 1b.

In the vibration isolator 101 formed in this manner, the fixing components 4 are allowed to be provided to the plurality of respective vibration isolating components 13 and an effect is thus produced that the natural frequency of the entire support structure including the compressor 12 and the vibration isolating components 13 is more easily increased.

In addition, the fixing component 4 is attached by being inserted into the slit 1e of the front panel 1b in a horizontal direction, that is, a direction along the XY plane, and it is thus possible to use a configuration in which only the lower part of the separator 6 is curved not to provide space above the vibration isolating component and thus produce an effect that the installation area is effectively used and the housing is downsized. When the outdoor unit is assembled, the separator is set after the compressor and the pipes are set. Thus, there is no problem about mounting of the stud 13b and the stopper 13d of the vibration isolating component 13.

Figure 8:
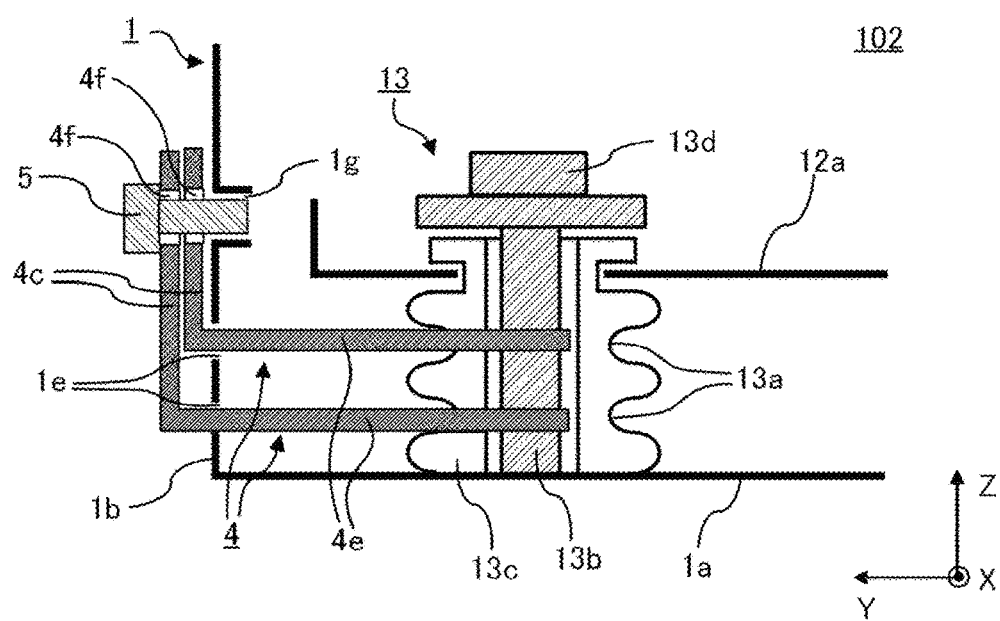
FIG. 8 is a sectional view illustrating part of a second modification example of the vibration isolator in Embodiment 1.

A second modification example of the vibration isolator in Embodiment 1 will be described with reference to FIG. 8. FIG. 8 is a sectional view illustrating part of a vibration isolator 102, which is the second modification example of the vibration isolator 100 in Embodiment 1.

The vibration isolating component 13 includes the plurality of narrow portions 13a, and, as illustrated in FIG. 8, the vibration isolator 102 differs from the vibration isolator 100 in Embodiment 1 in that a plurality of fixing components 4 are attached to a plurality of respective narrow portions 13a included in one vibration isolating component 13. The other configuration of the vibration isolator 102 is the same as the configuration of the vibration isolator 100, and its description is thus omitted.

The plurality of fixing components 4 each include the first flat part 4c having the first hole 4f. One screw 5 passes through the first holes 4f of the plurality of fixing components 4 and the fastening hole 1g of the front panel 1b and the screw 5 is fastened. Thus, the fixing components 4 are held along the front panel 1b of the housing 1. The front panel 1b has a plurality of slits 1e, into which the plurality of fixing components 4 are inserted, accordingly. In addition, the plurality of fixing components 4 are shaped to be mountable on different narrow portions 13a located at different heights by adjustment of the lengths of each first flat part 4c and each second flat part 4e.

In the vibration isolator 102 formed in this manner, attachment of the plurality of fixing components 4 to the plurality of respective narrow portions 13a of the vibration isolating component 13 improves an effect that increases the spring constant of the vibration isolating component 13. Thus, it is possible to reduce the spring constant of the vibration isolating component 13 compared with a case in which one fixing component 4 is attached and to further improve an effect that vibrations generated by operation of the compressor 12 are isolated.

Figure 9:
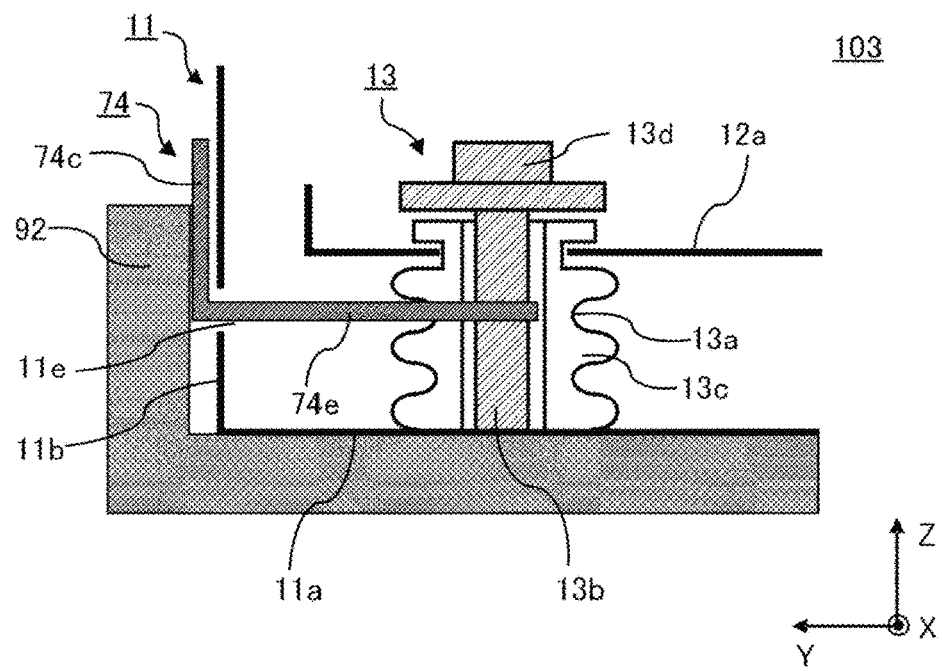
FIG. 9 is a sectional view illustrating part of a third modification example of the vibration isolator in Embodiment 1.

A third modification example of the vibration isolator in Embodiment 1 will be described with reference to FIG. 9. FIG. 9 is a sectional view illustrating part of a vibration isolator 103, which is the third modification example of the vibration isolator 100 in Embodiment 1.

As illustrated in FIG. 9, the vibration isolator 103 differs from the vibration isolator 100 in Embodiment 1 in that a fixing component 74 is held along a front panel 11*b* of a housing 11 by a packing material 92 instead of a screw. The other configuration of the vibration isolator 103 is the same as the configuration of the vibration isolator 100, and its description is thus omitted.

The surface on opposite side of a first flat part 74*c* of the fixing component 74 from the surface facing the front panel 11*b* of the housing 11, that is, the outer surface, of the first flat part 74*c* is in contact with the packing material 92. Thus, the fixing component 74 is held along the front panel 11*b*. The fixing component 74 thus differs from the fixing component 4 of the vibration isolator 100 in Embodiment 1 in that the first flat part 74*c* does not have a hole through which a fastening component such as a screw passes. The packing material 92 is not included in the components of the vibration isolator 103 and an outdoor unit including the vibration isolator 103.

The housing 11 is similar to the housing 1, in which the vibration isolator 100 in Embodiment 1 is set, in that the housing 11 is formed by a plurality of panels including a bottom plate 11*a* and the front panel 11*b* to form a cuboid shape and in that the front panel 11*b* has a slit 11*e*, into which the fixing component 74 is inserted. On the other hand, the housing 11 differs from the housing 1 in that the front panel 11*b* does not have a fastening hole through which a fastening component such as a screw passes.

Similarly to the fixing component 4 included in the vibration isolator 100 in Embodiment 1, the fixing component 74 is intended to reduce, for example, pipe breakage due to vibrations during transportation by attachment of a second flat part 74*e* of the fixing component 74 to the narrow portion 13*a* of the vibration isolating component 13. Thus, the fixing component 74 only has to be attached to the vibration isolating component 13 at least during transportation. During shipment or transportation, the outdoor unit including the vibration isolator 103 is packed by attaching, to upper and lower parts of the outdoor unit, a packing material made of, for example, styrene foam to cover corners of the outdoor unit, by covering, with corrugated cardboard, the outside of the outdoor unit to which the packing material is attached, and by fixing the covered outdoor unit with a plastic band. Thus, as illustrated in FIG. 9, the packing material 92 made of, for example, styrene foam is provided at a position where the packing material 92 holds the fixing component 74. As a result, it is possible to hold the fixing component 74 during transportation of the outdoor unit without additionally providing a fastening component such as a screw.

In the vibration isolator 103 formed in this manner, a fastening component such as a screw does not have to be provided to hold the fixing component 74 and an effect is thus produced that detachment of the fixing component 74 is more simplified and the number of components is reduced.

Embodiment 2

Figure 10:
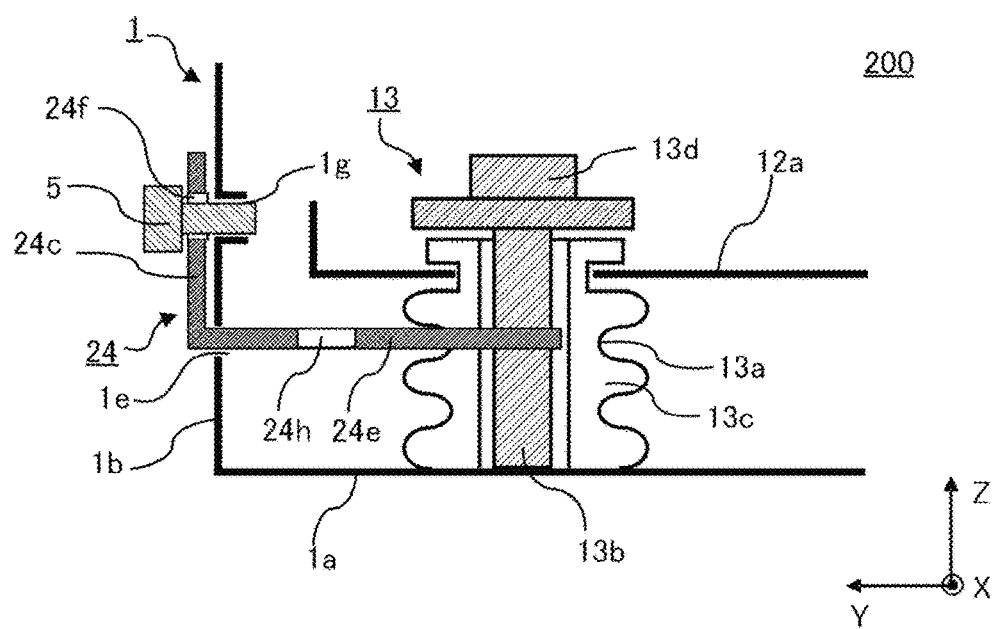
FIG. 10 is a sectional view illustrating part of a vibration isolator in Embodiment 2.
Figure 11:
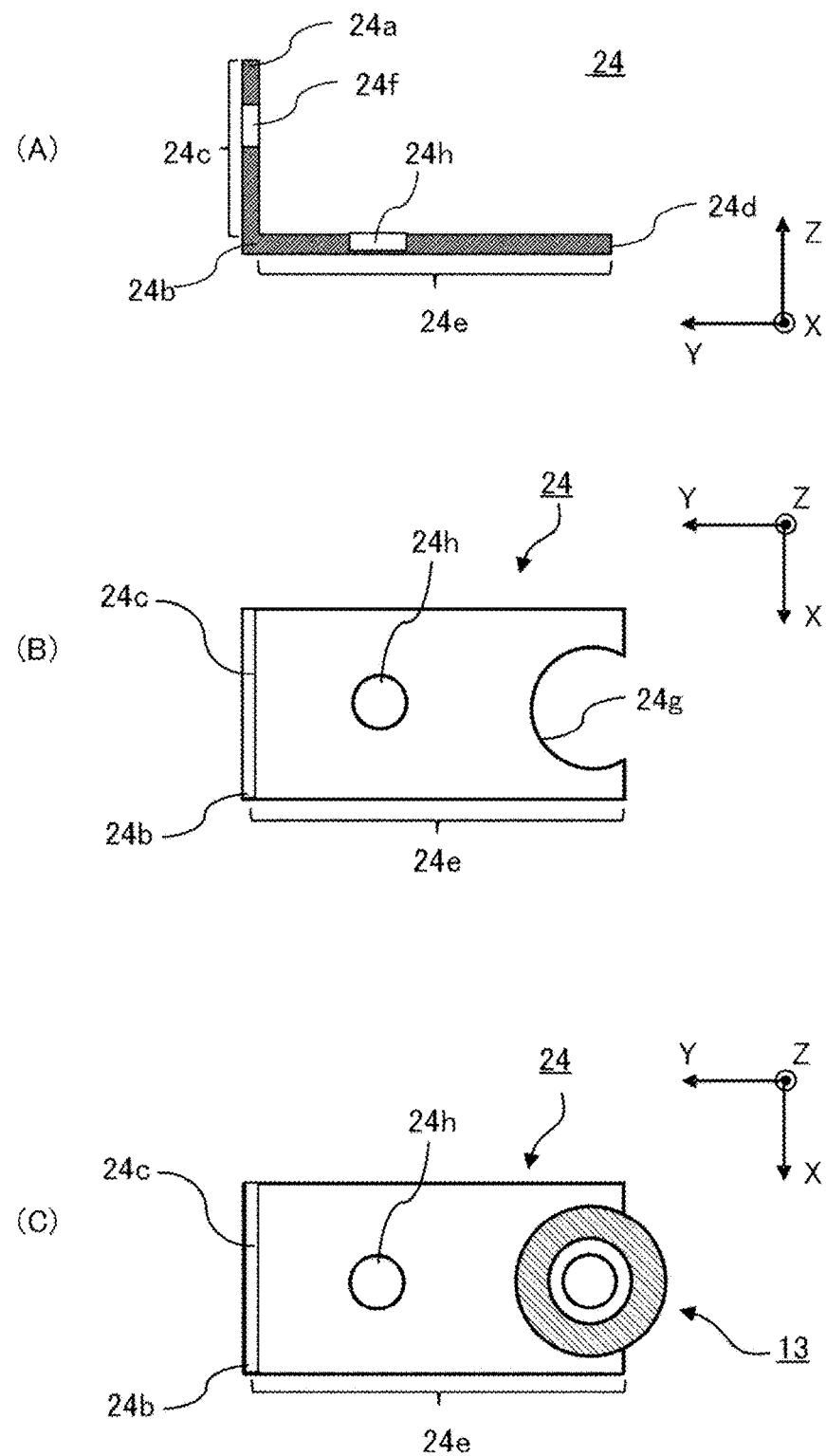
FIG. 11 includes a sectional view and top views for describing a fixing component of the vibration isolator in Embodiment 2.
Figure 12:
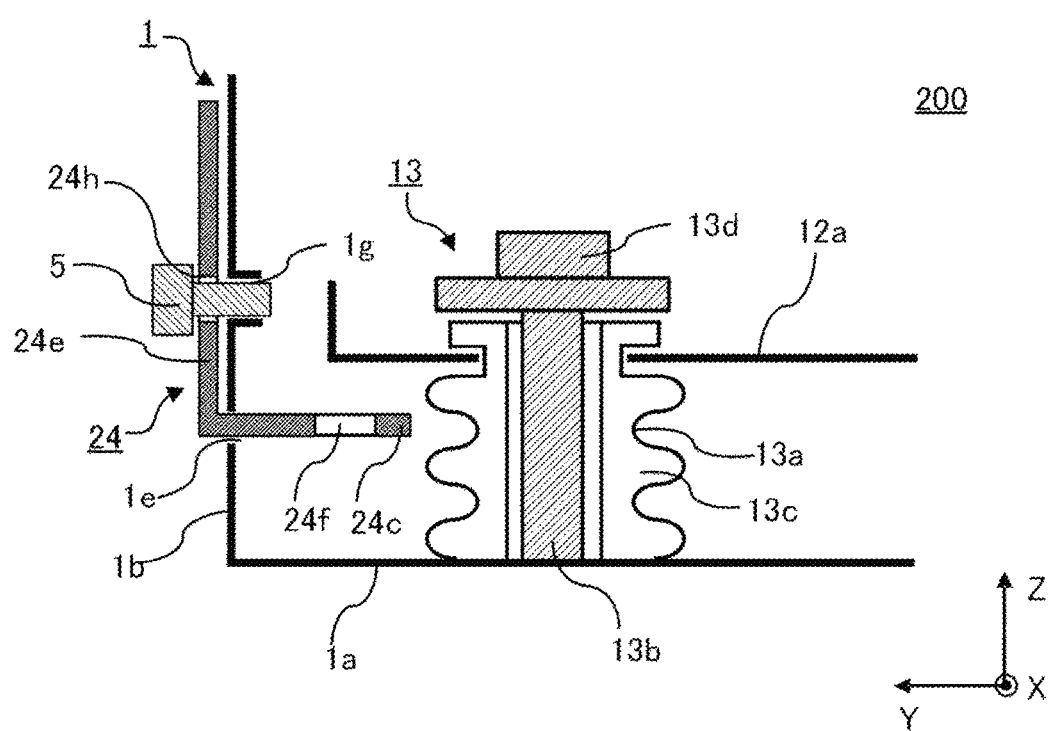
FIG. 12 is a sectional view illustrating part of the vibration isolator in Embodiment 2, the fixing component of the vibration isolator in Embodiment 2 being attached to be changed in position.

A vibration isolator in Embodiment 2 will be described with reference to FIGS. 10 to 12. FIG. 10 is a sectional view illustrating part of a vibration isolator 200 in Embodiment 2. FIG. 11(A) is a sectional view illustrating a fixing component 24 of the vibration isolator 200. FIG. 11(B) is a top view illustrating the fixing component 24. FIG. 11(C) is a top view illustrating the fixing component 24 attached to the vibration isolating component 13. FIG. 12 is a sectional view illustrating part of the vibration isolator 200, the fixing component 24 being attached to be changed in position after installation of an outdoor unit including the vibration isolator 200.

As illustrated in FIGS. 10 to 12, the vibration isolator 200 in Embodiment 2 differs from the vibration isolator 100 in Embodiment 1 in that the fixing component 24 is attachable to be changed in position. The other configuration of the vibration isolator 200 is the same as the configuration of the vibration isolator 100, and its description is thus omitted.

As illustrated in FIGS. 10 and 11, the fixing component 24 includes a first flat part 24*c* and a second flat part 24*e*. The first flat part 24*c* extends from one end 24*a* to a bent portion 24*b* and has a first hole 24*f*. The second flat part 24*e* extends from the bent portion 24*b* to the other end 24*d* and has a second hole 24*h*. The second hole 24*h* is provided to have a size in which the screw 5 is attachable through the second hole 24*h*, that is, a size in which the screw 5 is allowed to pass through the second hole 24*h*. The length from the bent portion 24*b* to the other end 24*d* extends to be longer than the length from the one end 24*a* to the bent portion 24*b*. The second flat part 24*e* has a cutout 24*g*.

The fixing component 4 of the vibration isolator 100 in Embodiment 1 is detached after installation of the outdoor unit and becomes an unnecessary component. On the other hand, the fixing component 24 of the vibration isolator 200 in Embodiment 2 is detached from the vibration isolating component 13 after installation of the outdoor unit including the vibration isolator 200, the first flat part 24*c* is inserted into the slit 1*e*, and the fixing component 24 is then fastened with the screw 5. Thus, as illustrated in FIG. 12, it is possible to hold the fixing component 24 along the front panel 1*b*.

In the vibration isolator 200 formed in this manner, the slit 1*e* and the fastening hole 1*g* provided in the front panel 1*b* of the housing 1 are blocked by attaching the fixing component 24 again and an effect is thus produced that prevents machine noise due to, for example, vibrations generated mainly in the machine chamber 7 in the housing 1 from being heard outside the housing 1 through the slit 1*e* and the fastening hole 1*g* and inhibits an increase in the noise of the outdoor unit.

In addition, blocking of the slit 1*e* and the fastening hole 1*g* enables inhibition of entrance of, for example, rainwater or small creatures and thus produces an effect that prevents, for example, a short circuit of an electric circuit or deterioration due to metal corrosion or hydrolysis of a vibration isolating rubber and inhibits a reduction in the product life.

Furthermore, when an installed outdoor unit is transported again, the fixing component 24 has to be attached to the vibration isolating component 13 again. In this case, the fixing component 24 is allowed to be attached to the housing 1 after the installation of the outdoor unit and an effect is thus produced that prevents loss of the fixing component 24.

Figure 13:
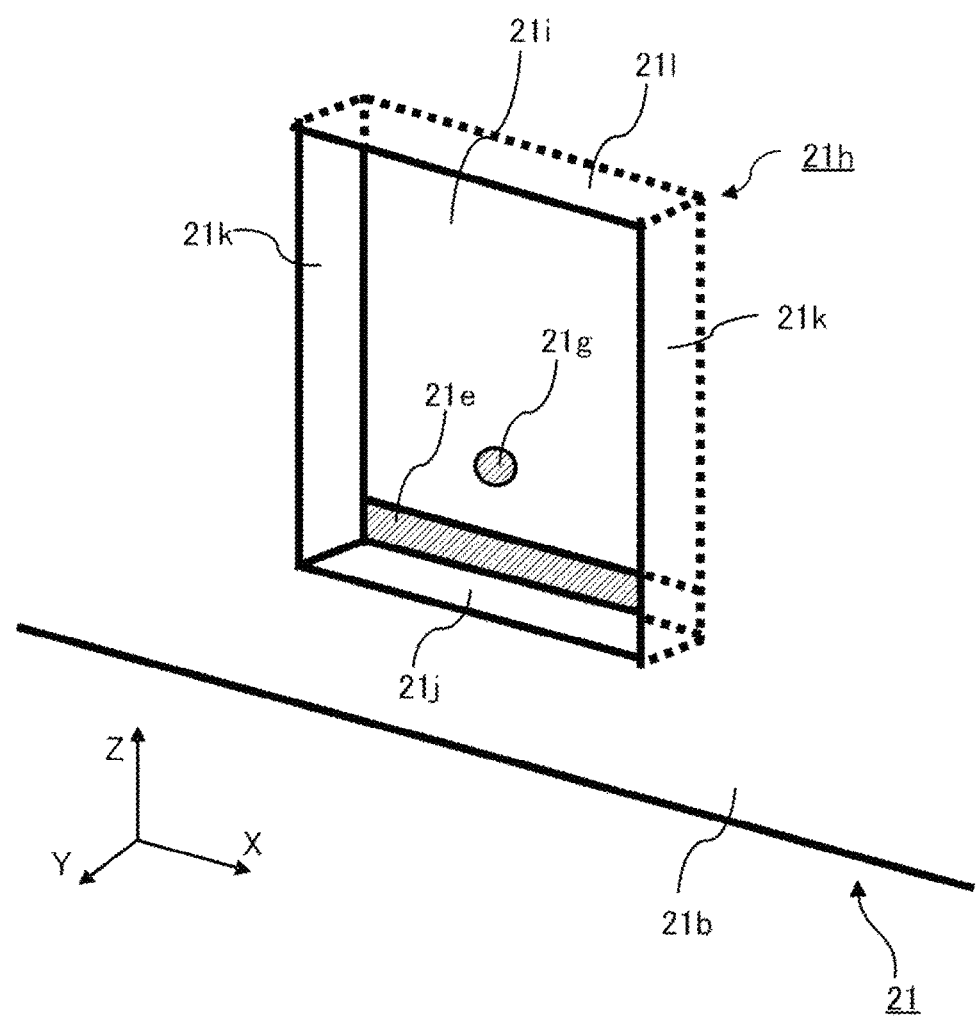
FIG. 13 is a perspective view for describing part of a modification example of the vibration isolator in Embodiment 2.
Figure 14:
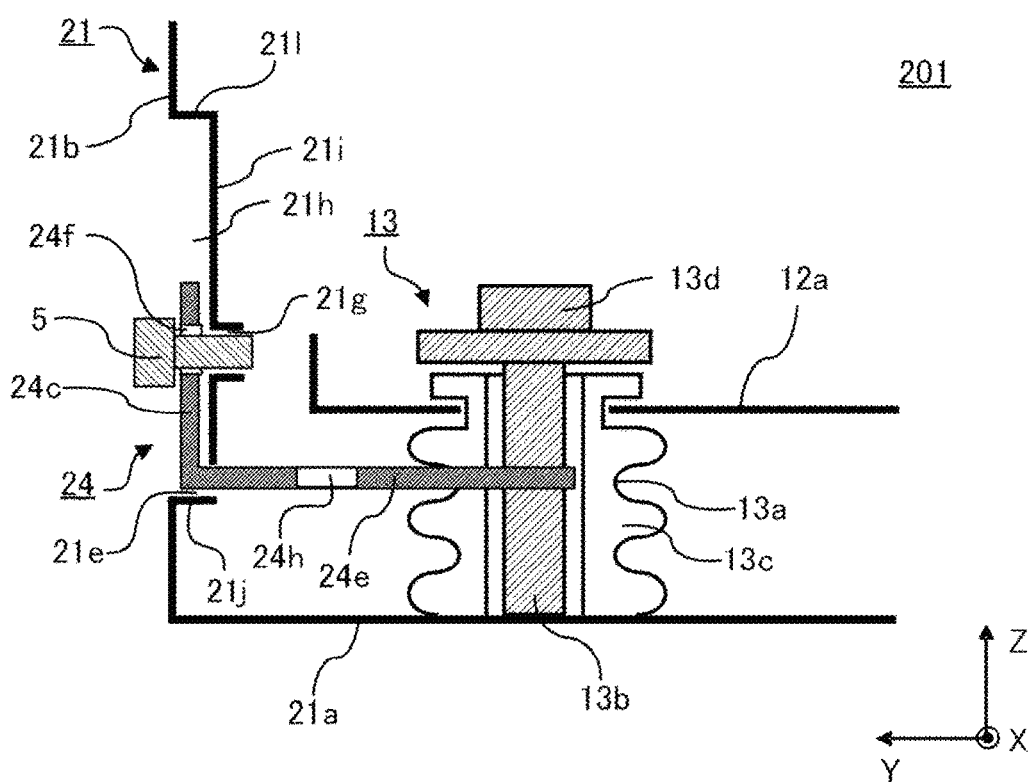
FIG. 14 is a sectional view illustrating part of the modification example of the vibration isolator in Embodiment 2.
Figure 15:
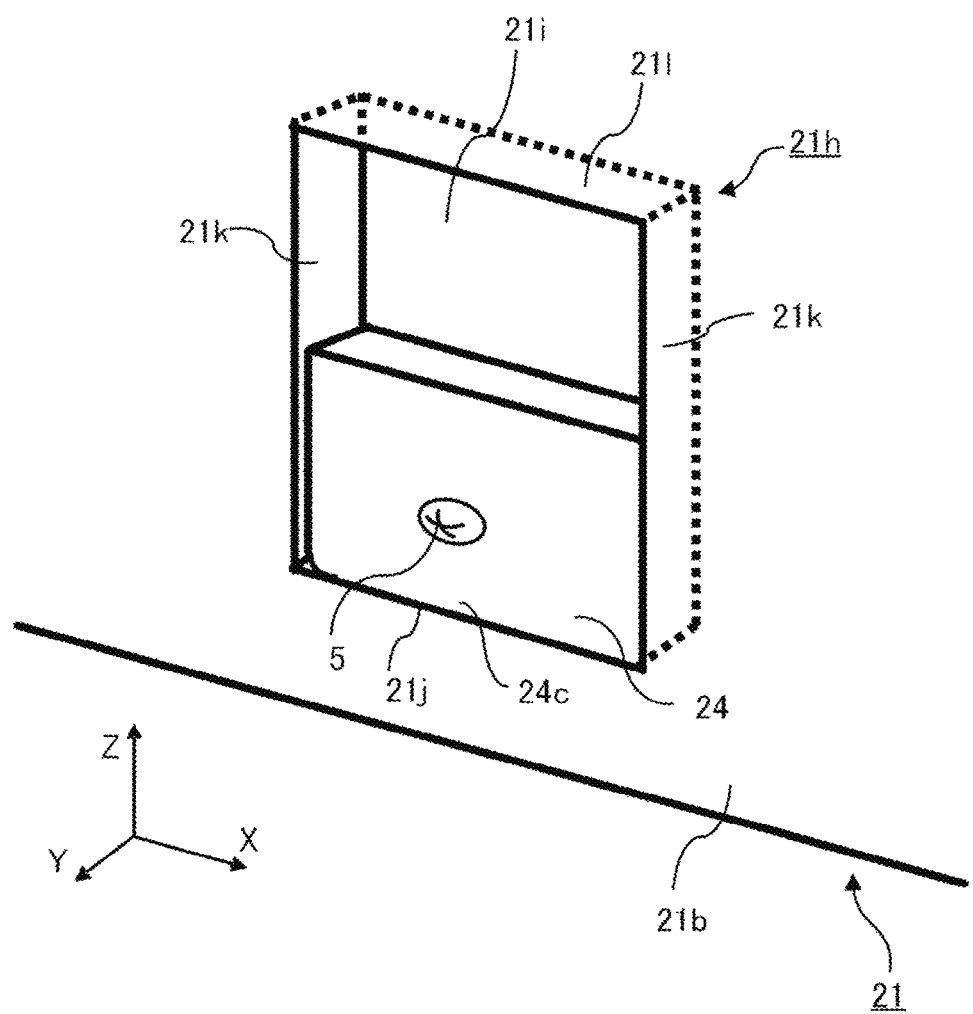
FIG. 15 is a perspective view illustrating part of the modification example of the vibration isolator in Embodiment 2.
Figure 16:
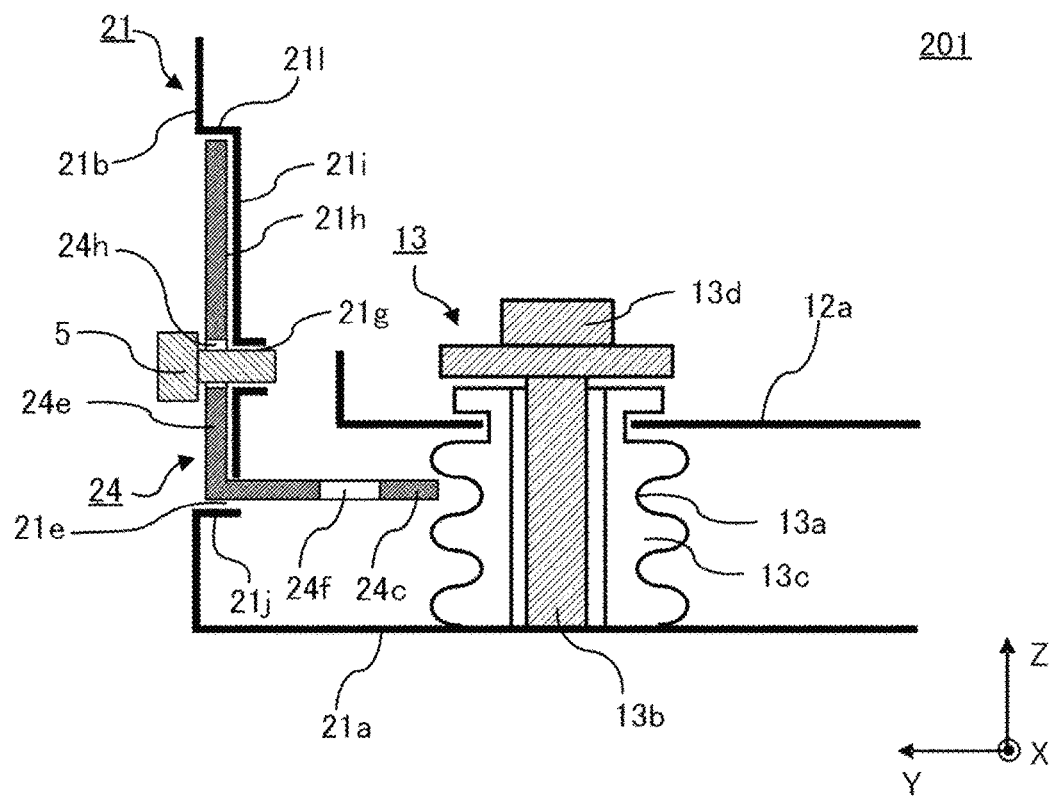
FIG. 16 is a sectional view illustrating part of the modification example of the vibration isolator in Embodiment 2, a fixing component of the modification example of the vibration isolator in Embodiment 2 being attached to be changed in position.
Figure 17:
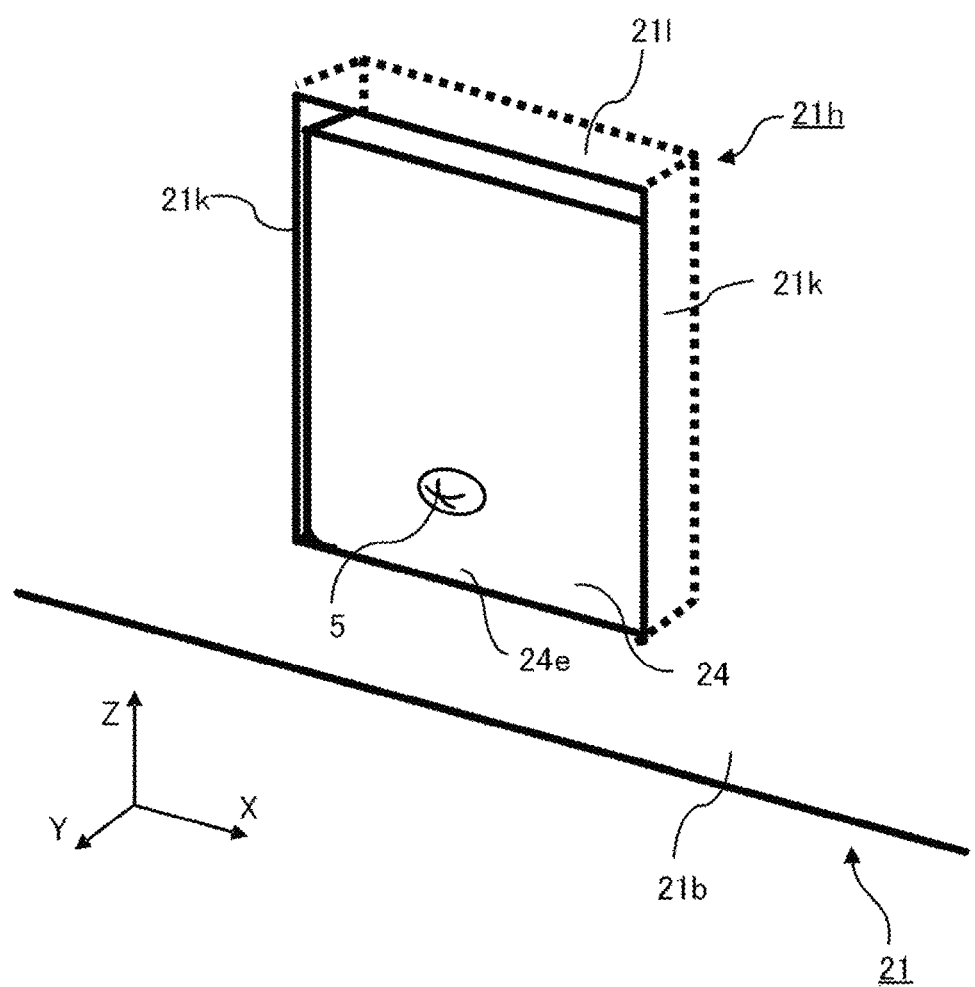
FIG. 17 is a perspective view illustrating part of the modification example of the vibration isolator in Embodiment 2, the fixing component of the modification example of the vibration isolator in Embodiment 2 being attached to be changed in position.

A modification example of the vibration isolator in Embodiment 2 will be described with reference to FIGS. 13 to 17. FIG. 13 is a perspective view illustrating part for describing the shape of a housing 21, in which a vibration isolator 201, which is the modification example of the vibration isolator 200 in Embodiment 2, is set. FIG. 14 is a sectional view illustrating part of the vibration isolator 201. FIG. 15 is a perspective view illustrating part of the vibration isolator 201. FIG. 16 is a sectional view illustrating part of the vibration isolator 201, a fixing component 24 of the vibration isolator 201 being attached to be changed in position after installation of an outdoor unit including the vibration isolator 201. FIG. 17 is a perspective view illustrating part of the vibration isolator 201 illustrated in FIG. 16.

As illustrated in FIGS. 13 to 15, the vibration isolator 201 differs from the vibration isolator 200 in Embodiment 2 in that the housing 21 has a recess 21h for positioning the fixing component 24. The other configuration of the vibration isolator 201 is the same as the configuration of the vibration isolator 200, and its description is thus omitted.

As illustrated in FIG. 13, the recess 21h is formed in a front panel 21b of the housing 21. When viewed from the outside of the housing 21, the recess 21h is formed by a recessed surface 21i, which has a slit 21e and a fastening hole 21g and which is provided to be recessed in an inward direction of the housing 21, that is, the-Y direction, a bent bottom surface 21j, bent sides 21k, and a bent upper surface 21l, which extend from the recessed surface 21i in an outward direction of the housing 21, that is, the +Y direction. The number of the provided bent sides 21k is two. The two bent sides 21k face each other with a space between the bent sides 21k and the space has its length substantially equal to the width of the fixing component 24.

The slit 21e is formed in a lower part, that is, a part at the −Z side, of the recessed surface 21i of the recess 21h. Thus, when the second flat part 24e of the fixing component 24 is inserted into the slit 21e, as illustrated in FIGS. 14 and 15, the second flat part 24e of the fixing component 24 is in contact with the bent bottom surface 21j and is thus guided in a horizontal direction, that is, a direction along the XY plane. The second flat part 24e is thus positioned.

Similarly to the vibration isolator 200 in Embodiment 2, as illustrated in FIG. 14, the first flat part 24c of the fixing component 24 has the first hole 24f, and the second flat part 24e of the fixing component 24 has the second hole 24h. Thus, the fixing component 24 is attachable to be changed in position after installation of the outdoor unit. When the fixing component 24 is attached to be changed in position, as illustrated in FIGS. 16 and 17, the second flat part 24e of the fixing component 24 is fitted into the recess 21h of the front panel 21b, and the first flat part 24c of the fixing component 24 is in contact with the bent bottom surface 21j and is thus guided in a horizontal direction, that is, a direction along the XY plane. The first flat part 24c is thus positioned.

Thus, it is preferable to form the recessed surface 21i of the recess 21h to have an area larger than that of each of the first flat part 24c and the second flat part 24e of the fixing component 24. Panels of the housing 21 including the front panel 21b are each manufactured by press working and may have recesses and projections to increase the rigidity. Thus, it is easy to provide the recess 21h.

In the vibration isolator 201 formed in this manner, when the fixing component 24 is inserted into the slit 21e of the front panel 21b, the fixing component 24 is guided in a horizontal direction by the bent bottom surface 21j of the recess 21h and an effect is thus produced that the fixing component 24 is positioned to be attached to the vibration isolating component 13.

In addition, in the vibration isolator 201, the surface of the fixing component 24 to be in contact with the bent bottom surface 21j of the recess 21h receives a load generated by vibrations in the vertical direction, that is, the Z direction, for example, during transportation of the outdoor unit, the load is dispersed, and an effect is thus produced that reduces deformation of the front panel 21b of the housing 21.

Furthermore, provision of the two bent sides 21k facing each other with a space between the bent sides 21k and the space has its length substantially equal to the width of the fixing component 24 inhibits rotation of the fixing component 24 around the screw 5 and an effect is thus produced that reduces loosening of the screw 5.

The vibration isolator 201 has been described as a modification example of the vibration isolator 200 in Embodiment 2. For example, it is needless to say that such a recess may be provided in the housing 1, in which the vibration isolator 100 in Embodiment 1 is set, and other embodiments and modification examples may be combined without contradicting each other.

Embodiment 3

Figure 18:
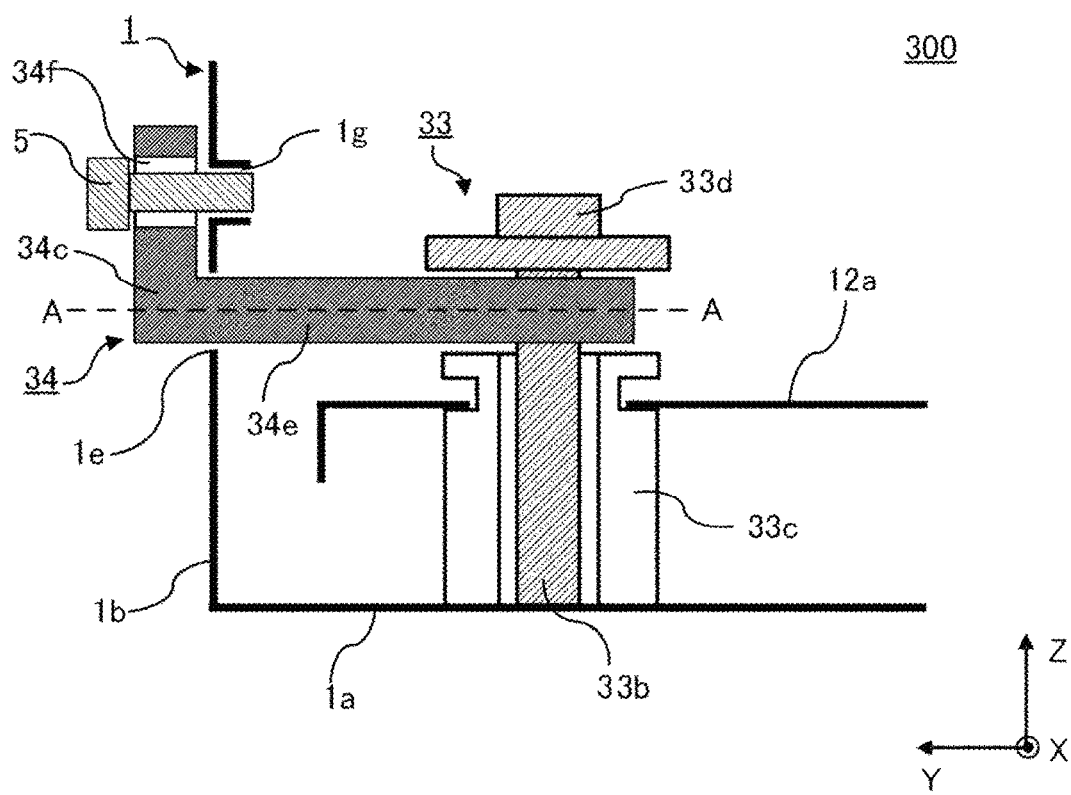
FIG. 18 is a sectional view illustrating part of a vibration isolator in Embodiment 3.
Figure 19:
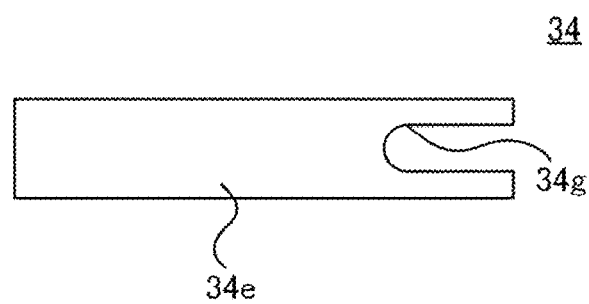
FIG. 19 is a sectional view illustrating a fixing component of the vibration isolator in Embodiment 3.

A vibration isolator in Embodiment 3 will be described with reference to FIGS. 18 and 19. FIG. 18 is a sectional view illustrating part of a vibration isolator 300 in Embodiment 3. FIG. 19 is a sectional view illustrating a fixing component 34 taken along section A-A of the vibration isolator 300 illustrated in FIG. 18.

As illustrated in FIG. 18, the vibration isolator 300 in Embodiment 3 differs from the vibration isolator 100 in Embodiment 1 in that the fixing component 34 is attached to surround, above a rubber 33c of a vibration isolating component 33, part of the periphery of a stud 33b. The other configuration of the vibration isolator 300 is the same as the configuration of the vibration isolator 100, and its description is thus omitted.

The vibration isolating component 33 is formed by the stud 33b, which has a rod shape and which is fixed onto the bottom plate 1a of the housing 1, the rubber 33c, which is attached to the periphery of the stud 33b such that an upper part, that is, a part at the +Z side, of the stud 33b is exposed, and a stopper 33d, which is attached to a screw portion at the upper part of the stud 33b. The shape of the rubber 33c of the vibration isolating component 33 is not limited and may be, for example, a cylindrical shape in which the side of the rubber 33c does not have a narrow portion as illustrated in FIG. 18 or a shape in which the side of the rubber 33c has a narrow portion. The vibration isolating component 33 supports, with the rubber 33c, the support portion 12a of the compressor 12.

Similarly to the fixing component 4 provided in the vibration isolator 100 in Embodiment 1, the fixing component 34 includes a first flat part 34c, which extends from one end to a bent portion, and a second flat part 34e, which extends from the bent portion to the other end. The first flat part 34c has a first hole 34f. As illustrated in FIG. 19, the second flat part 34e of the fixing component 34 has a cutout 34g at the other end. The cutout 34g is formed by adjusting the diameter of the cutout 34g such that the cutout 34g surrounds part of the periphery of the stud 33b and has a U shape whose at least part is an arc shape. By surrounding part of the periphery of the stud 33b with the cutout 34g, the vibration isolating component 33 is attached and fixed.

The cutout 34g of the fixing component 34 surrounds part of the periphery of the upper part of the stud 33b, and the fixing component 34 is provided between the stopper 33d and the rubber 33c. Thus, the spring constant of the rubber 33c does not change. The rigidity of the fixing component 34 mainly inhibits, in particular, the displacement in an up-down direction due to vibrations of a compressor. The rigidity of the fixing component 34 is increased by, for example, increasing the thickness of the fixing component 34.

The vibration isolator 300 formed in this manner produces an effect that the shape of the vibration isolating component 33 is freely designed. In addition, adjustment of the rigidity of the fixing component 34 enables an increase in the natural frequency of the entire support structure including the compressor 12 and the vibration isolating component 33 and an effect is thus produced that a design is easily changed in accordance with required specifications.

Figure 20:
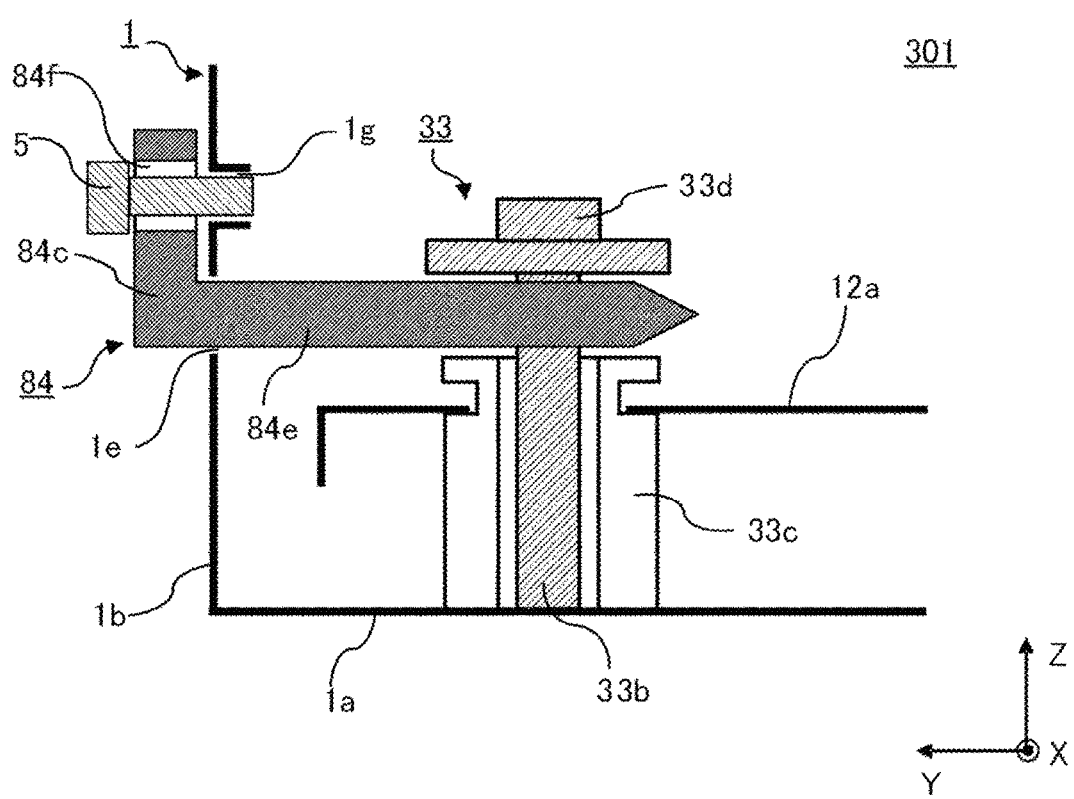
FIG. 20 is a sectional view illustrating part of a modification example of the vibration isolator in Embodiment 3.
Figure 21:
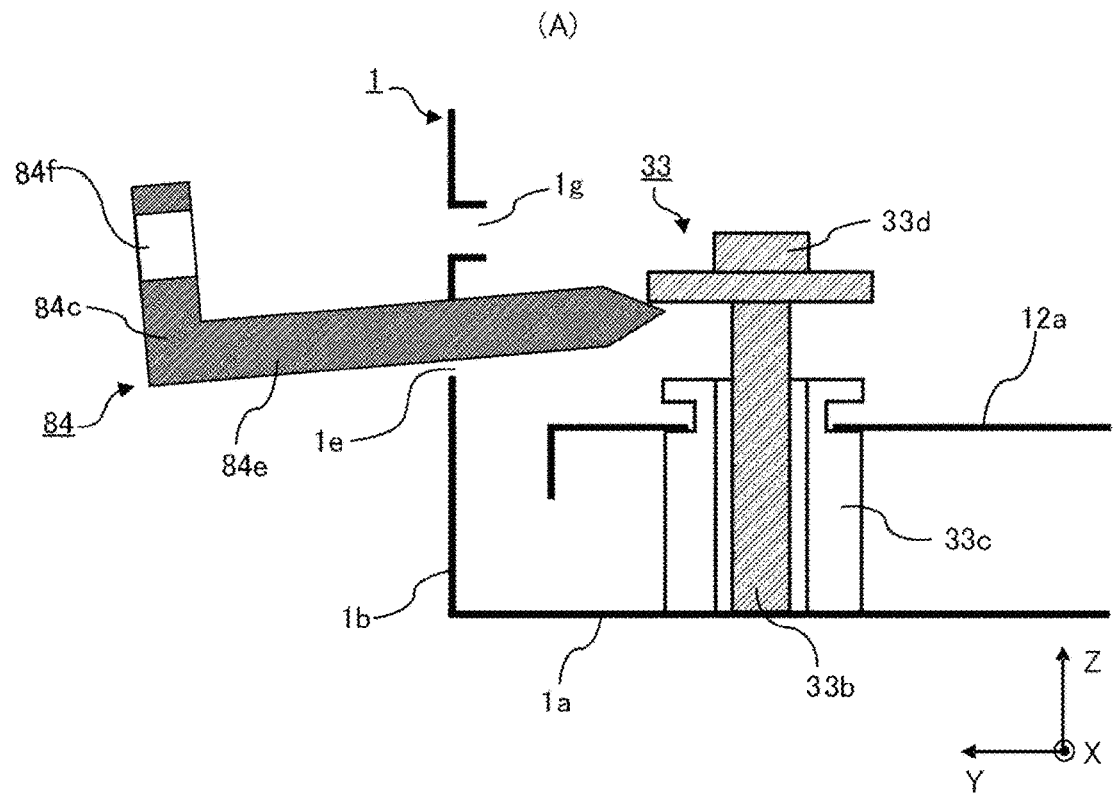
FIG. 21 includes sectional views each illustrating part of the modification example of the vibration isolator in Embodiment 3 when a fixing component of the modification example of the vibration isolator in Embodiment 3 is inserted.
Figure 21:
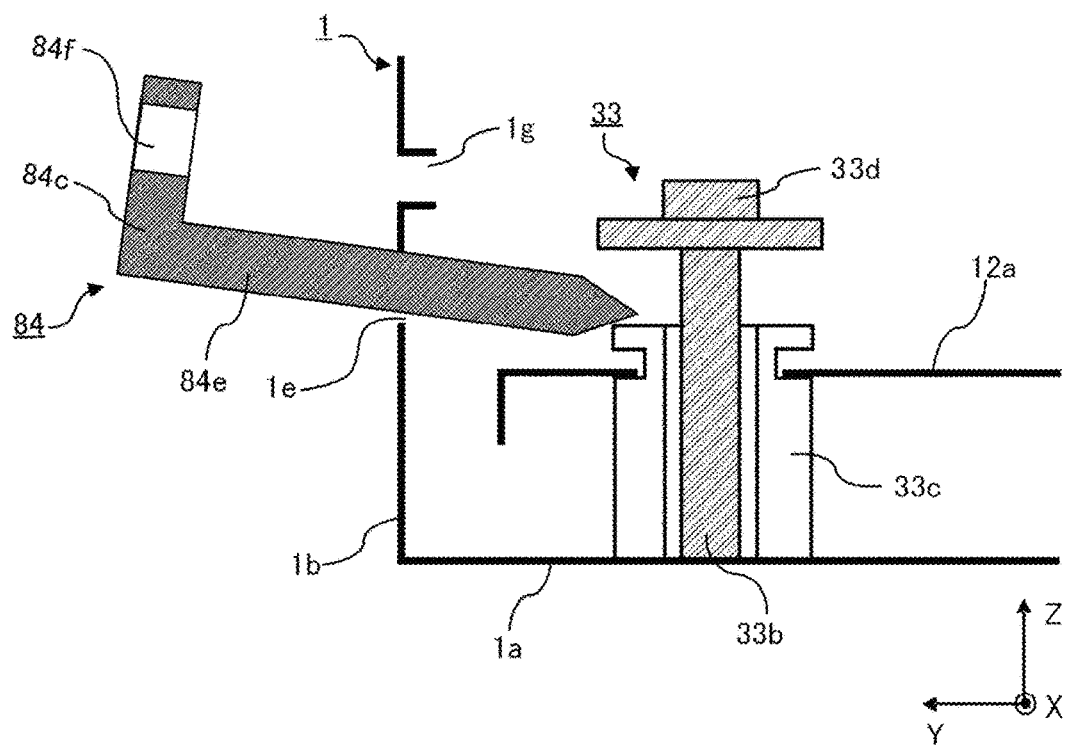

A modification example of the vibration isolator in Embodiment 3 will be described with reference to FIGS. 20 and 21. FIG. 20 is a sectional view illustrating part of a vibration isolator 301, which is the modification example of the vibration isolator 300 in Embodiment 3. FIG. 21 includes sectional views each illustrating part of the vibration isolator 301 when a fixing component 84 of the vibration isolator 301 is inserted.

As illustrated in FIG. 20, the vibration isolator 301 differs from the vibration isolator 300 in Embodiment 3 in the shape of the part of a second flat part 84e of the fixing component 84 at the other end. The other configuration of the vibration isolator 301 is the same as the configuration of the vibration isolator 300, and its description is thus omitted.

Similarly to the fixing component 34 provided in the vibration isolator 300 in Embodiment 3, the fixing component 84 includes a first flat part 84c, which extends from one end to a bent portion, and the second flat part 84e, which extends from the bent portion to the other end. The first flat part 84c has a first hole 84f. In addition, similarly to the fixing component 34 of the vibration isolator 300 in Embodiment 3, the fixing component 84 has a U-shaped cutout at the other end. The cutout is similar to the cutout 34g illustrated in FIG. 19 and is thus not illustrated. The part of the second flat part 84e of the fixing component 84 at the other end has a tapered shape in which the thickness of the second flat part 84e in the Z direction is gradually reduced. Thus, as illustrated in FIG. 21, even when the fixing component 84 is inserted into the slit 1e of the housing 1 and is inclined in the Z direction, it is possible to insert the fixing component 84 between the rubber 33c and the stopper 33d.

The vibration isolator 301 formed in this manner produces an effect that the fixing component 84 is more easily attached.

Embodiment 4

Figure 22:
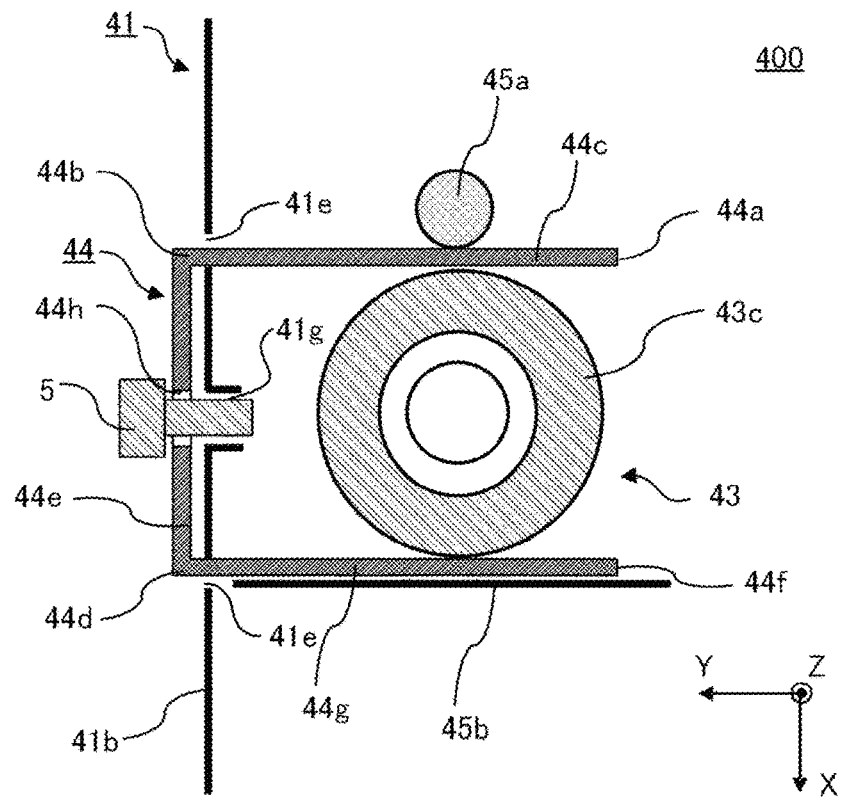
FIG. 22 is a sectional view illustrating part of a vibration isolator in Embodiment 4.

A vibration isolator in Embodiment 4 will be described with reference to FIG. 22. FIG. 22 is a top view illustrating part of a vibration isolator 400 in Embodiment 4.

As illustrated in FIG. 22, the vibration isolator 400 in Embodiment 4 differs from the vibration isolator 100 in Embodiment 1 in that a fixing component 44 is attached to hold the side of a vibration isolating component 43 from two sides and in that the vibration isolator 400 includes a support pole 45a and a support plate 45b, which serve as support components in contact with the fixing component 44. The other configuration of the vibration isolator 400 is the same as the configuration of the vibration isolator 100, and its description is thus omitted.

As illustrated in FIG. 22, a rubber 43c of the vibration isolating component 43 has a cylindrical shape. The shape of the rubber 43c is not limited to the illustrated cylindrical shape and may be, for example, a shape in which a narrow portion is provided or a rectangular column shape. In addition, the entire vibration isolating component 43 may be made of, for example, a rubber material, which is an elastic body, or the vibration isolating component 43 may be partly made of an elastic body.

The fixing component 44 includes a first flat part 44c, which extends from one end 44a to a first bent portion 44b, a second flat part 44e, which extends from the first bent portion 44b to a second bent portion 44d and which is provided outside the housing 41, and a third flat part 44g, which extends from the second bent portion 44d to the other end 44f. In addition, the first bent portion 44b and the second bent portion 44d are each formed to be substantially perpendicularly bent. The first flat part 44c and the third flat part 44g face each other across the vibration isolating component 43. Furthermore, the second flat part 44e has a first hole 44h through which the screw 5 is attached.

The support pole 45a is apart from the side of the vibration isolating component 43 and is provided to be in contact with the first flat part 44c of the fixing component 44. That is, the first flat part 44c of the fixing component 44 is held between the support pole 45a and the vibration isolating component 43. The shape of the support pole 45a is not limited to a rod shape as long as the component is a support component with which the first flat part 44c of the fixing component 44 is fixed not to move in the X direction.

The support plate 45b is apart from the side of the vibration isolating component 43 and is provided to be in contact with the third flat part 44g of the fixing component 44. That is, the third flat part 44g of the fixing component 44 is held between the support plate 45b and the vibration isolating component 43. The support pole 45a and the support plate 45b are provided opposite to each other across the vibration isolating component 43. For example, part of the separator 6 or part of the housing 41 is usable as the support plate. The support pole and the support plate may be set to be switched in position, and their shapes are not limited to a rod shape and a plate-like shape as long as the components are usable as support components.

A front panel 41b of a housing 41 has two slits 41e, whose long-side direction is the Z direction. The first flat part 44c and the third flat part 44g of the fixing component 44 are inserted into the two respective slits 41e. In addition, the front panel 41b of the housing 41 has a fastening hole 41g between the two slits 41e. The fixing component 44 is held by attaching the screw 5, which passes through the fastening hole 41g and the first hole 44h of the second flat part 44e of the fixing component 44.

The vibration isolator 400 formed in this manner produces an effect that inhibits deformation of the vibration isolating component 43 in a horizontal direction and increases the spring constant. In addition, the vibration isolator 400 produces an effect that the vibration isolating component 43 is freely designed because there is no limitation on the shape of the vibration isolating component 43.

Furthermore, in the vibration isolator 400, the first flat part 44c and the third flat part 44g of the fixing component 44 are in surface contact with the side of the vibration isolating component 43, and their contact area is thus large, and therefore improves an effect that inhibits deformation of the vibration isolating component 43 in a horizontal direction. It is thus possible to further increase the spring constant.

Embodiment 5

Figure 23:
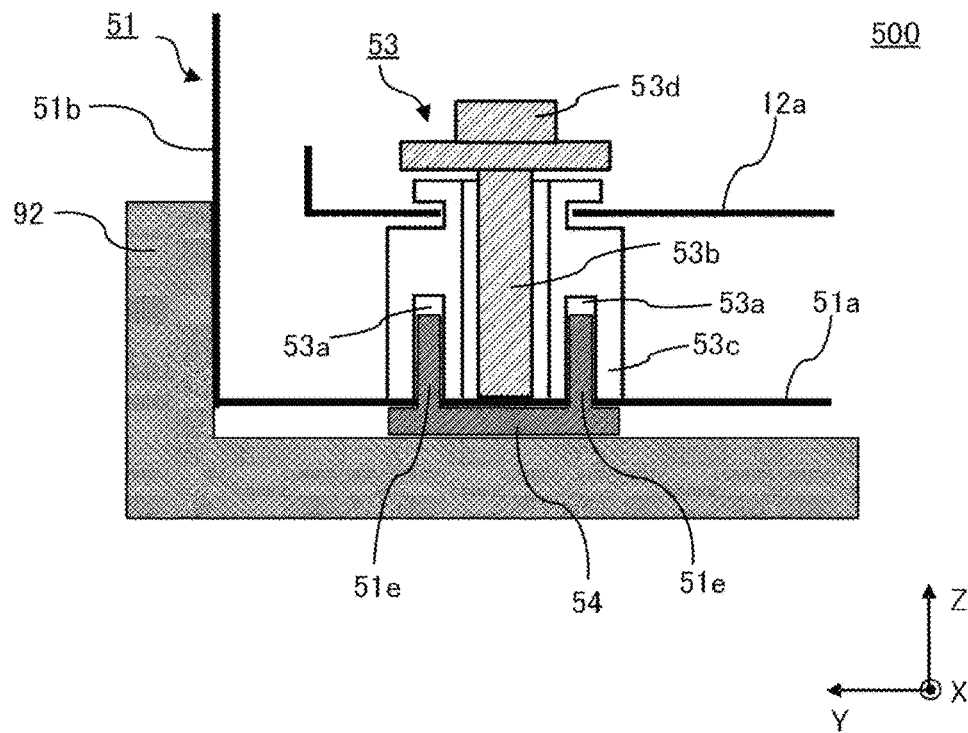
FIG. 23 is a sectional view illustrating part of a vibration isolator in Embodiment 5.
Figure 24:
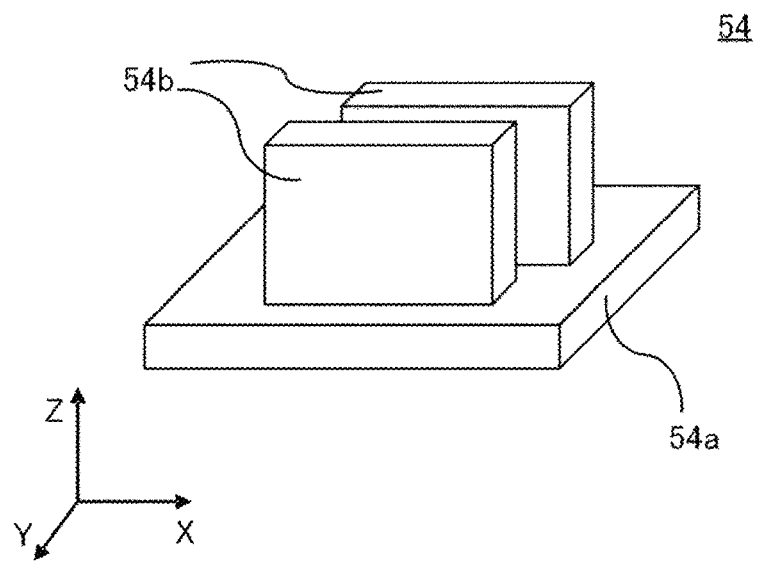
FIG. 24 is a perspective view illustrating a fixing component of the vibration isolator in Embodiment 5.

A vibration isolator in Embodiment 5 will be described with reference to FIGS. 23 and 24. FIG. 23 is a sectional view illustrating part of a vibration isolator 500 in Embodiment 5. FIG. 24 is a perspective view illustrating a fixing component 54 of the vibration isolator 500.

As illustrated in FIGS. 23 and 24, the vibration isolator 500 in Embodiment 5 differs from the vibration isolator 100 in Embodiment 1 in that the fixing component 54 is attached to a rubber 53c of a vibration isolating component 53 by being inserted through a bottom plate 51a of a housing 51. The other configuration of the vibration isolator 500 is the same as the configuration of the vibration isolator 100, and its description is thus omitted.

As illustrated in FIG. 24, the fixing component 54 includes a base 54a and two projections 54b. The base 54a and the projections 54b each have a plate-like shape. The number of the projections 54b to be provided is not limited to two, and any number and any shape of the components may be used as long as the components are inserted through the bottom plate plate 51a of the housing 51 and fixes the vibration isolating component 53. The fixing component 54 is easily formed by, for example, resin molding. The fixing component 54 is held, from a lower side, that is, the-Z side, by the packing material 92, which is provided outside the housing 51. The packing material 92 is not included in the components of the vibration isolator 500 and an outdoor unit including the vibration isolator 500.

The bottom plate 51a of the housing 51 has two slits 51e, into which the projections 54b of the fixing component 54 are inserted. The slits 51e are provided to fix the vibration isolating component 53 by insertion of the projections 54b of the fixing component 54 into the slits 51e. Thus, the slits 51e may have any shape as long as the projections 54b of the fixing component 54 are engaged with the slits 51e.

Similarly to the vibration isolating component 13, the vibration isolating component 53 is formed by a stud 53b, which is fixed onto the bottom plate 51a of the housing 51, the rubber 53c, which is attached to the stud 53b, and a stopper 53d, which is attached to an upper part, that is, a screw portion on the +Z side, of the stud 53b. As illustrated in FIG. 23, the rubber 53c of the vibration isolating component 53 has two recesses 53a at a portion of the rubber 53c facing toward the bottom plate 51a. The projections 54b of the fixing component 54 are inserted into the respective recesses 53a. The shape of the rubber 53c of the vibration isolating component 53 may be, for example, a cylindrical shape in which the side of the rubber 53c does not have a narrow portion or a shape in which the side of the rubber 53c has a narrow portion, and the shape of the side of the rubber 53c is not limited. The vibration isolating component 53 supports the support portion 12a of the compressor 12.

The vibration isolator 500 formed in this manner produces an effect that inhibits deformation of the vibration isolating component 53 in a horizontal direction and increases the spring constant. In addition, the vibration isolator 500 produces an effect that the vibration isolating component 53 is freely designed because there is no limitation on the shape of the side of the vibration isolating component 53. Furthermore, the vibration isolator 500 produces an effect that reduces detachment of the fixing component 54 during transportation because the projections 54b of the fixing component 54 are inserted into the respective recesses 53a of the vibration isolating component 53.

Furthermore, the fixing component 54 of the vibration isolator 500 is mounted in the vibration isolating component 53 through the bottom plate 51a of the housing 51. Thus, space does not have to be provided around the vibration isolating component 53 and thus an effect is produced that the installation area is effectively used and the housing is downsized. In addition, because the fixing components 54 are attached to a plurality of respective vibration isolating components 53 regardless of, for example, the shape of a side of the housing 51 and the position where the compressor 12 is attached, an effect is produced that the natural frequency is more easily adjusted.

Embodiment 6

Figure 25:
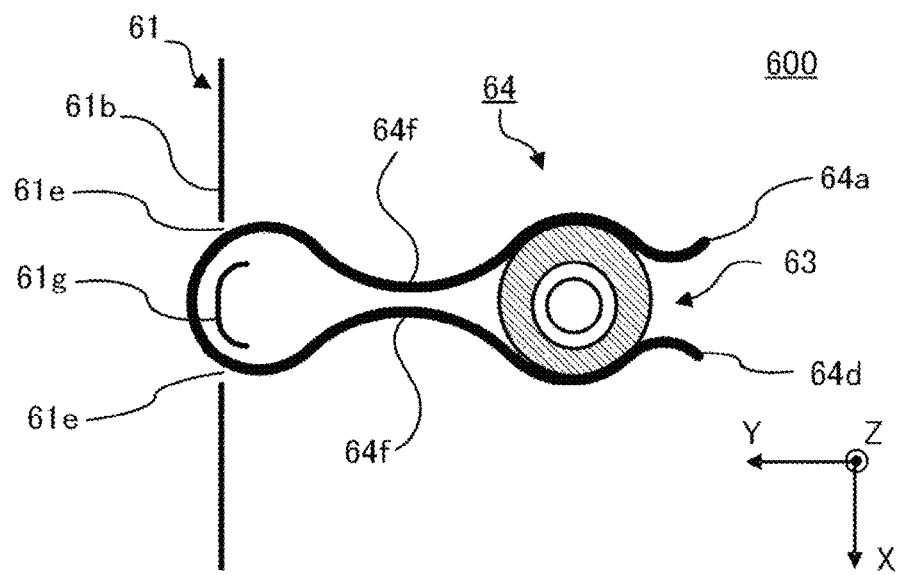
FIG. 25 is a top view illustrating part of a vibration isolator in Embodiment 6.
Figure 26:
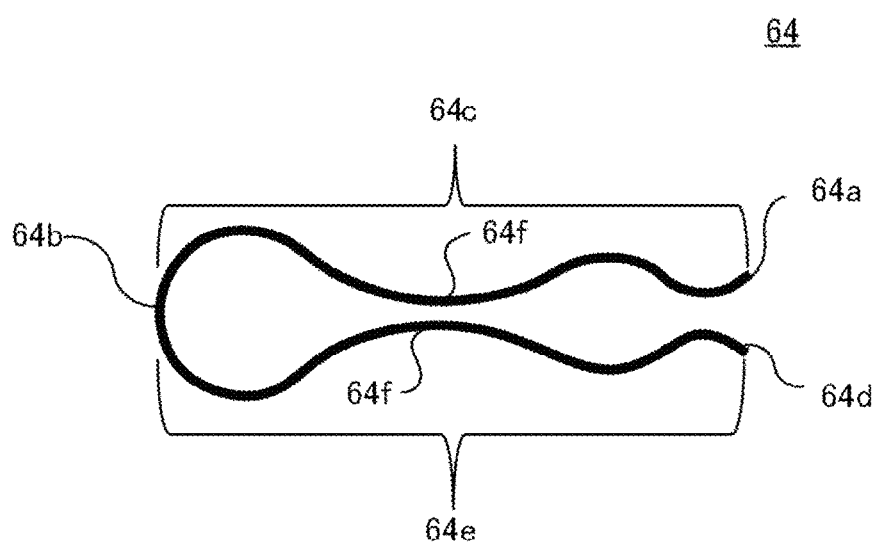
FIG. 26 is a schematic view illustrating a fixing component of the vibration isolator in Embodiment 6.

A vibration isolator in Embodiment 6 will be described with reference to FIGS. 25 and 26. FIG. 25 is a top view illustrating part of a vibration isolator 600 in Embodiment 6. FIG. 26 is a schematic view illustrating a fixing component 64 of the vibration isolator 600.

As illustrated in FIGS. 25 and 26, the vibration isolator 600 in Embodiment 6 differs from the vibration isolator 100 in Embodiment 1 in that the fixing component 64 has a clip shape and in that no additional components are used to hold the fixing component 64. The other configuration of the vibration isolator 600 is the same as the configuration of the vibration isolator 100, and its description is thus omitted.

As illustrated in FIG. 26, the fixing component 64 is formed by a first part 64c, which extends from one end 64a to a middle portion 64b, which is curved, and a second part 64e, which extends from the middle portion 64b to the other end 64d, which is provided inside the housing 61. In addition, the fixing component 64 includes a narrow portion 64f, which is formed such that part of the first part 64c and part of the second part 64e approach each other. The fixing component 64 is a component that has a clip shape and a spring force and that is made of, for example, a metal. As illustrated in FIGS. 25 and 26, the fixing component 64 is inserted into the housing 61 through the front panel 61b of the housing 61. Then, a vibration isolating component 63 is fixed with the fixing component 64 by being held between the part between the narrow portion 64f and the one end 64a and the part between the narrow portion 64f and the other end 64d, the distance between the parts being wider, such that the parts cover part of the outer side of the vibration isolating component 63.

A front panel 61b of a housing 61 has two slits 61e, which each have a hole shape and into which the fixing component 64 is inserted. In addition, a curved portion 61g, which is curved to fit the shape of the fixing component 64, is formed between the two slits 61e. When the fixing component 64 is stably attached, the curved portion 61g does not have to be provided.

As illustrated in FIG. 25, the vibration isolating component 63 has a cylindrical shape. The entire vibration isolating component 63 may be made of, for example, a rubber material, which is an elastic body, or the vibration isolating component 63 may be partly made of an elastic body. When the vibration isolating component 63 is formed to include a narrow portion to which the fixing component 64 is attached, the fixing component 64 is more stably attached to the vibration isolating component 63.

The vibration isolator 600 formed in this manner does not require a fastening component such as a screw, and the fixing component 64 is fixed to the vibration isolating component 63 with a spring force of the fixing component 64, and an effect is thus produced that labor of attachment work and detachment work of the fixing component 64 is reduced and such a fastening component is omitted.

Embodiments described above may be combined, modified, and omitted as appropriate, and such combinations, modifications, and omission are included in the scope of the present disclosure.

REFERENCE SIGNS LIST 1, 11, 21, 41, 51, 61: housing, 1a, 11a, 21a, 51a: bottom plate, 1b, 11b, 21b, 41b, 51b, 61b: front panel, 1e, 11 e, 21e, 41e, 51e, 61e: slit, 1g, 21g, 41g: fastening hole, 21h: recess, 21i: recessed surface, 21j: bent bottom surface, 4, 24, 34, 44, 54, 64, 74, 84: fixing component, 4a, 24a, 44a, 64a: one end, 4b, 24b: bent portion, 4c, 24c, 34c, 44c, 74c, 84c: first flat part (first part), 4d, 24d, 44f, 64d: other end, 4e, 24e, 34e, 44e, 74e, 84e: second flat part (second part), 4f, 24f, 34f, 44h, 84f: first hole, 4g, 24g, 34g: cutout, 24h: second hole, 44b: first bent portion, 44d: second bent portion, 44g: third flat part (third part), 54a: base, 54b: projection, 64b: middle portion, 64c: first part, 64e: second part, 64f: narrow portion, 5: screw (fastening component), 12: compressor (vibration source), 12a: support portion, 13, 33, 43, 53, 63: vibration isolating component, 13a: narrow portion, 13b, 33b: stud, 13c, 33c, 43c: rubber, 13d, 33d: stopper, 53a: recess, 45a: support pole (first support component), 45b: support plate (second support component), 100, 101, 102, 103, 200, 201, 300, 301, 400, 500, 600: vibration isolator, 1000: outdoor unit

The invention claimed is:

1. A vibration isolator comprising:
a vibration isolating component including an elastic body, the vibration isolating component supporting, in a housing having a slit, a vibration source that includes a motor and that is on a bottom plate of the housing; and
a fixing component to pass through the slit and detachable from an outside of the housing, the vibration isolating component being fixed, in the housing, with the fixing component,
the slit being in a side of the housing,
the fixing component having a shape of a plate and including
a first part extending from one end of the fixing component to a bent portion, and
a second part extending from the bent portion to an other end of the fixing component,
the first part being on the outside of the housing to be held along the side of the housing,
the second part being in the slit, and
the vibration isolating component being fixed with a part of the second part at the other end.

2. The vibration isolator of claim 1, wherein:
the vibration isolating component includes a narrow portion at a side of the vibration isolating component, and
the fixing component includes a cutout, at the other end, formed to surround part of a periphery of the narrow portion.

3. The vibration isolator of claim 2, wherein:
the fixing portion is one of a plurality of fixing portions, the narrow portion is one of a plurality of narrow portions, and
the plurality of fixing portions are attached to at least two of the plurality of narrow portions.

4. The vibration isolator of claim 1, wherein:
the vibration isolating component includes:
a stud having a rod shape, the stud being fixed onto the bottom plate of the housing,
the elastic body attached to a periphery of the stud such that an upper part of the stud is exposed, and
a stopper attached to the upper part of the stud,
the fixing component includes a cutout, at the other end, formed to surround part of a periphery of the upper part of the stud, and
the part of the second part at the other end is provided between the elastic body and the stopper.

5. The vibration isolator of claim 1, wherein:
the housing further includes a fastening hole,
the first part of the fixing component includes a first hole, and
the fixing component is fastened and held, from the outside of the housing, with a fastening component that passes through the fastening hole and the first hole and is attached.

6. The vibration isolator of claim 5, wherein;
the fixing component is formed such that a length from the other end to the bent portion is longer than a length from the one end to the bent portion, and
the second part of the fixing component includes a second hole having a size in which the fastening component passes through the second hole.

7. The vibration isolator of claim 1, wherein:
the fixing component is held by a packing material around the housing.

8. The vibration isolator of claim 1, wherein;
the side of the housing includes a recess including:
a recessed surface having the slit, the recessed surface being provided to be recessed in an inward direction of the housing, and
a bent bottom surface bent at a lower side of the recessed surface in an outward direction of the housing, and
the fixing component is positioned by disposing a part of the second part at the bent portion to be in contact with the bent bottom surface of the recess.

9. An outdoor unit for an air-conditioning apparatus, the outdoor unit comprising:
the vibration isolator of claim 1,
wherein the vibration source comprises a compressor.

* * * * *